US010931742B2

(12) United States Patent
Colle et al.

(10) Patent No.: US 10,931,742 B2
(45) Date of Patent: Feb. 23, 2021

(54) STATE REPLICATION OF VIRTUAL NETWORK FUNCTION INSTANCES

(71) Applicants: Koninklijke KPN N.V., Rotterdam (NL); IMEC VZW, Leuven (BE); Universiteit Gent, Ghent (BE)

(72) Inventors: Didier Colle, Gentbrugge (BE); Wouter Tavernier, Bruges (BE)

(73) Assignees: Koninklijke KPN N.V., Rotterdam (NL); IMEC VZW, Leuven (BE); Universiteit Gent, Ghent (BE)

( * ) Notice: Subject to any disclaimer, the term of this patent is extended or adjusted under 35 U.S.C. 154(b) by 164 days.

(21) Appl. No.: 15/513,516

(22) PCT Filed: Sep. 28, 2015

(86) PCT No.: PCT/EP2015/072201
§ 371 (c)(1),
(2) Date: Mar. 22, 2017

(87) PCT Pub. No.: WO2016/050663
PCT Pub. Date: Apr. 7, 2016

(65) Prior Publication Data
US 2017/0331884 A1 Nov. 16, 2017

(30) Foreign Application Priority Data
Sep. 29, 2014 (EP) .................... 14186821

(51) Int. Cl.
H04L 29/08 (2006.01)
H04L 12/24 (2006.01)
G06F 9/455 (2018.01)
H04L 12/46 (2006.01)

(52) U.S. Cl.
CPC ...... *H04L 67/1002* (2013.01); *G06F 9/45558* (2013.01); *H04L 12/4641* (2013.01);
(Continued)

(58) Field of Classification Search
CPC ............. H04L 67/1002; H04L 12/4641; H04L 41/0659; H04L 41/0668; G06F 9/45558; G06F 2009/45595
(Continued)

(56) References Cited

U.S. PATENT DOCUMENTS 7,660,306 B1 * 2/2010 Eiriksson ............ H04L 12/4641
370/392
9,198,222 B2 * 11/2015 Lozinski ............ H04L 41/0677
(Continued)

FOREIGN PATENT DOCUMENTS

CN 103607349 A 2/2014

OTHER PUBLICATIONS

Dreibholz et. al., "The Applicability of Reliable Server Pooling (RSerPool) for Virtual Network Function Resource Pooling (VNFPOOL)", by Network Working Group, Apr. 22, 2014 (Year: 2014).*

(Continued)

Primary Examiner — Sm A Rahman
(74) Attorney, Agent, or Firm — Hamilton, Brook, Smith & Reynolds, P.C.

(57) ABSTRACT

A method to be carried out by an interface element (IE, 510) between a VNF pool (508) and a control entity (520) is disclosed. The VNF pool (508) comprises a plurality of VNF instances (502) including at least a first and second instances. The control entity (520) is configured to control the VNF instances (502) of the pool (508). The method enables the IE (510) to assist in replicating a state of the first VNF instance on the second VNF instance. The method includes steps of obtaining a control message provided from the control entity (520) to the first VNF instance (502), providing the obtained control message at least to the first and to the second VNF instances (502), and providing an
(Continued)

acknowledgement of the control message to the control entity (520) when the interface element (510) has an acknowledgement, either explicit or implicit, of both the control message provided to the first VNF instance (502) and the control message provided to the second VNF instance (502).

14 Claims, 14 Drawing Sheets

(52) U.S. Cl.
CPC ...... *H04L 41/0659* (2013.01); *H04L 41/0668* (2013.01); *G06F 2009/45595* (2013.01)

(58) Field of Classification Search
USPC .......................................................... 709/249
See application file for complete search history.

(56) References Cited

U.S. PATENT DOCUMENTS

| | | | |
|---|---|---|---|
| 2010/0054132 A1 | 3/2010 | Mitsumori | |
| 2011/0265938 A1* | 11/2011 | Hernandez | H01H 29/06 156/146 |
| 2015/0381423 A1* | 12/2015 | Xiang | H04L 41/0893 709/223 |
| 2017/0180218 A1* | 6/2017 | Rasanen | H04L 41/5041 |

OTHER PUBLICATIONS

Dreibholz, T., et al., "The Applicability of Reliable Server Pooling (RSerPool) for Virtual Network Functions Resource Pooling (VNFPOOL)," draft-dreibholz-vnfpool-rserpool-applic-01.txt, Internet Engineering Task Force, Network Working Group, (Apr. 22, 2014).

Xia, L., et al., "Requirements and Use Cases for Virtual Network Functions," draft-xia-vnfpool-use-cases-01.txt, Internet Engineering Task Force, Network Working Group, (May 15, 2014).

Extended European Search Report for EP 14186821.6, entitled: State Replication of Virtual Network Function Instances , dated Mar. 16, 2015.

International Search Report for PCT/EP2015/072201, entitled: State Replication of Virtual Network Function Instances, dated Dec. 21, 2015.

ETSI GS NFV-SWA 001, No. VQ. 2.1, Network Functions Virtualisation (NFV); Virtual Network Functions Architecture (Sep. 18, 2014).

* cited by examiner

STATE REPLICATION OF VIRTUAL NETWORK FUNCTION INSTANCES

RELATED APPLICATIONS

This application is the U.S. National Stage of International Application No. PCT/EP2015/072201, filed Sep. 28, 2015, which designates the U.S., published in English, and claims priority under 35 U.S.C. §§ 119 or 365(c) to Europe Application No. 14186821.6, filed Sep. 29, 2014. The entire teachings of the above applications are incorporated herein by reference.

FIELD OF INVENTION

The disclosure generally relates to the field of virtual network functions (VNFs). In particular, though not necessarily, the disclosure relates to methods, systems, and computer program products for replicating a state of one VNF instance of a VNF pool on at least one other VNF instance of the pool.

BACKGROUND

In conventional telecommunication networks, functions such as e.g. firewalls, load balancers and Wireless Access Network (WAN) optimizers are deployed on dedicated specialized hardware servers in the networks of network operators and data centers. These functions are important in that they serve as the building blocks of all network services. A recent trend has been to virtualize these functions, i.e. to decouple the functions from their dedicated hardware by implementing them as Virtual Network Function instances (VNF instances) e.g. run as software on general purpose servers.

One challenge with deployment of network functions as VNF instances is reliability because the reliability mechanisms of software instances of such functions are currently not on the same level compared to more conventional hardware implementations engineered for X nines availability.

One current approach attempting to ensure reliability of VNF implementations follows Reliable Server Pooling (RSerPool) architecture by employing a VNF pool of multiple VNF instances providing the same function. FIG. 1 provides a schematic illustration of a RSerPool architecture 100 while FIG. 2 provides a schematic illustration of a VNF pool architecture 200 following the RSerPool architecture shown in FIG. 1.

As shown in FIG. 1, the RSerPool architecture 100 utilizes three types of components: a pool element (PE) 102, a pool registrar 104, and pool user 106. The PE 102 denotes a server in a pool 108, the pool 108 shown in the example of FIG. 1 as comprising three instances of the PE 102, all instances of the PE 102 within the pool 108 configured to provide the same network service by implementing a certain network function. The PU 106 denotes a client using the service of the pool 108. The PR 104 denotes the management component, managing the pool 108, and possibly other pools not shown in FIG. 1. The functionality of the PR 104 and the PU 106 is described in greater detail below. The pool 108, the PR 104, and the PU 106 communicate using Aggregate Server Access Protocol (ASAP), as shown with the double arrows between these elements.

The VNF pool architecture 200 of FIG. 2 follows the architecture of FIG. 1 by employing a VNF pool 208 comprising different VNF instances as pool elements 202 (shown in the example of FIG. 2 as elements VNF i1, i2, and i3), managed by a VNF registrar 204, and configured to serve a user 206 of the VNF pool 208. An example of the user 206 would be a Service Function Chain (SFC) control system, which is a control entity in charge of orchestrating the SFC as defined in the SFC control framework being defined by the IETF SFC working group. The VNF instances 202 are analogous to the PE 102, the VNF registrar 204 is analogous to the PR 104, the SFC control system 206 is analogous to the PU 106, and the VNF pool 208 is analogous to the pool 108, described above. Similar to the elements of the RSerPool architecture 100, the VNF instances 202, the VNF registrar 204 and the user 206 may communicate using ASAP.

The bootstrapping process of a VNF pool is also inherited from the RSerPool architecture and is depicted in FIG. 3. First, the PR 104, which in the context of VNFs would be the VNF registrar 204, announces itself to various pool elements using ASAP message 302. A particular pool element PE 102, which in the context of VNFs would be the VNF i 202, e.g. VNF i1, may then choose the PR 104 to register into the pool 108, which in the context of VNFs would be the VNF pool 208, using ASAP message 304. Once registration is confirmed, the PR 204 is referred as the PR-H (Pool Registrar-Home), shown in FIG. 3 as PR-H 306. From this moment, the status of the PE 102 registered with the PR 104 is actively monitored by the PR 104 via keep-alive messages 308 and 310, with an exchange rate usually on the order of seconds. The PU 106, which in the context of VNFs could e.g. be the SFC control system 206, may then request a service of a PE instance (i.e. a VNF instance) from the PR 104 using e.g. a message 312, the process referred to as "handle resolution". In response to the request 312, the PR 104 may then select a handle 312 corresponding to a particular PE 102 to return to the PU 106, e.g. based on a static or an adaptive policy.

If the PR 104 detects that the active PE is down, for example by detecting a time-out in the keep-alive process, it can update the handle towards the PU 106. On the other hand, if the PU 106 is the first one to detect a failure of the active PE, it can inform the PR 104 and ask for an alternate handle.

RSerPool was designed to be application-independent. Therefore, state replication between PEs within the same pool is considered to be a task of the pool users. Nevertheless, RSerPool provides some supporting mechanisms supported by its ASAP messaging protocol. One such mechanism involves cookies, which are particular state messages ("dumps") which can be sent from the active PE to the PU using the service of the active PE in order to provide the PU with the latest state of the active PE. Upon failure of the active PE, this information can be sent by the PU to the newly chosen PE. As used herein, the term "active PE" or "primary PE", and similarly the terms "active VNF instance" and "primary VNF instance", refers to the PE or the VNF instance for which the handle has last been used, or is currently used, by the PU or user of the VNF pool.

FIG. 4A provides a schematic illustration of a default failover process with state replication between different VNF instances of the same pool relying on regular exchange of cookie messages 402 between the active VNF instance, shown in FIG. 4A as "PE1", and the PU 106. In such a case, the PU 106 is itself responsible for restoring state in the newly selected PE, shown in FIG. 4A as "PE2". The process of FIG. 4A illustrates that the status of the PE's 102 of the pool 108 that are registered with the PR 104 (in the example of FIG. 4A—PE1 and PE2) is actively monitored by the PR-H 104 via keep-alive messages 404 and 408 for the PE2 and PE1, respectively, messages 404 and 408 being analogous to the message 308 shown in FIG. 3. A message 406, analogous to the message 310 shown in FIG. 3, illustrates that PE2 acknowledges the KEEP_ALIVE message 404 of the PR-H, while the time-out event 410 illustrates that the primary PE, PE1, does not acknowledge the KEEP_ALIVE message 408. When that happens, the PR 104 notifies the PU 106 about the alternate PE, PE2, as shown with a message 414, i.e. the PR 104 provides to the PU 106 a handle 412 to the PE2, thereby making the PE2 the active, or the primary, PE. After the reception of this notification, the PU 106 can transfer all state information for the PE1 received via a cookie message 402, towards the alternate backup PE2, as shown in FIG. 4A with a message 414. The PE2 can then update its state to that of the PE1 in step 416. In other words, the state of PE1 is then replicated on the PE2.

A double arrow labeled "FAILOVER TIME 418" in FIG. 4A illustrates a so-called failover time, which refers to the time period from detecting a failure of the active PE, PE1, to restoring the state of PE1 on the alternative PE, PE2. When network services are provisioned using chained VNFs in the form of an SFC, rapid handling of VNF failures in the data plane, i.e. short failover time, is of crucial importance. In particular, telecommunication network services often demand 5 nines reliability and failover times in the order of 50 milliseconds (ms). Hitless data plane switch-over is thus a highly needed feature e.g. for firewall network functions or switching functionality.

There are several problems in trying to implement failover mechanisms for VNF instances within a VNF pool by relying on active exchange of cookie/state dump messages as described in FIG. 4A. One problem is that the user of the VNF pool, which could be the same entity as the PU, has to be responsible for state replication from the primary to the alternative PE, which is not always desirable. Another problem is that many Network Functions maintain state which can easily require more than hundreds of MBs of memory, resulting into delays in the order of seconds to minutes for copying involved state using cookie message 414 upon the switch to an alternative PE. Yet another problem is that providing the cookie messages 402 from the primary PE to the PU in the first place takes significant bandwidth between the primary PE and the PU.

For example, a large class of VNF instances are controlled by a control/management entity which itself could be a VNF. Such an entity is referred to herein as a "control entity" or "\control VNF". Examples of such VNF instances and corresponding control entities include OpenFlow switches and their interaction with OpenFlow controllers using the OpenFlow protocol between the control entity and the VNF instance to communicate the rules to be installed on the VNF instance, firewalls configured by either management or automatic deep packet inspection (DPI) or intrusion detection modules, or more general class of network functions configured by Network Configuration Protocol (NETCONF) or Simple Network Management Protocol (SNMP). In the context of OpenFlow, the state of such VNF instances is then determined by a table of rules communicated from the control entity to the VNF instance, the table referred to as a "flow table". The default failover process in this context is illustrated in FIG. 4B. FIG. 4B is similar to FIG. 4A in that it illustrates all elements 402-418 described for FIG. 4A (their description is, therefore, not repeated for FIG. 4B) but it also illustrates exchange of control messages 422 and their acknowledgements 424 between a control VNF 420 and the primary PE, PE1. As shown in FIG. 4B, the control messages 422 includes rules, shown as RULE 1 through RULE n, which are periodically provided from the primary PE, PE1, to the PU 106 in the cookie message 402 described earlier. The cookie message 402 in such a case includes a flow table 426 comprising a data structure storing the OpenFlow rules or flow entries. The number, n, of rules in an OpenFlow switch can easily be in the order of 10K flow entries, representing state for more than hundreds of MBs of memory, which results in a significant failover time.

While the discussion above concentrated mainly on the failover process, similar problems arise in situations that require replication of state of one VNF instance of a VNF pool on at least one other VNF instance of the pool in the absence of a failure of the primary VNF. Such situations include e.g. switching a service provided by one VNF instance to another VNF instance of the VNF pool, e.g. when the latter VNF instance has more capacity in case of a near overload situation, or load sharing of a service between two VNF instances. The failover time 418 is also of concern in such situations, where the term "failover time" in that context is better re-named to a "switchover time" as it represents the time it takes to switch between two different VNF instances of a VNF pool although no real failure occurred.

What is needed in the art is a technique for replicating a state of one VNF instance of a VNF pool on at least one other VNF instance of the VNF pool that can improve or eliminate at least some of the drawbacks discussed above.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To reduce or eliminate at least some of the problems discussed above, according to one aspect of an embodiment of the present invention, a computer-implemented method to be carried out by an interface element between a VNF pool and a control entity is disclosed. The VNF pool comprises a plurality of VNF instances which include at least a first VNF instance (VNF i1) and a second VNF instance (VNF i2). The control entity is configured to control the VNF instances of the VNF pool. The method enables the interface element to assist in replicating a state of the first VNF instance at least on the second VNF instance. The method includes steps of obtaining in some manner, i.e. receiving, intercepting, determining, etc., a control message provided from the control entity to the first VNF instance, providing the obtained control message at least to the first VNF instance and to the second VNF instance, and providing an acknowledgement of the control message to the control entity when the interface element has an acknowledgement, either explicit or implicit, of both the control message provided to the first VNF instance and the control message provided to the second VNF instance.

As used herein, the term "VNF instance" refers to software running on a computer server, e.g. a general purpose server, thereby providing virtualization of application, computer server, system, hardware component or network functions, to a slice of a physical network function which is able to share its functionality between multiple users, or a combination of both the software and the slice of a physical network function.

As used herein, the term "control message" refers to any control or management message sent by the control entity and destined to reach a VNF instance.

Embodiments of the present invention are based on recognition that providing an interface element between VNF instances of a VNF pool and a control entity controlling the VNF instances allows duplicating control messages sent by the control entity to one of the VNF instances to other VNF instances. Since control messages received by the VNF instances define their state, such duplication allows replication of a state of one VNF instance on one or more other VNF instances within the pool. Thus, as used herein, the expression "replicating a state of one VNF instance on another VNF instance" and similar expressions refer to an interface element assisting that the state of the first VNF instance is replicated on the second VNF instance by the interface element providing control messages destined to the first VNF instance to not only the first but also the second VNF instance.

The state replication, in turn, provides various advantages in different scenarios that may require that a handle to a new VNF instance is provided to a user of the VNF pool, either in place of or in addition to the handle to the primary VNF instance provided to the pool user, where, as used herein, the term "handle" refers to an addressable identifier, such as e.g. an IP or MAC address, of a network component, in this context a VNF instance.

One such scenario is related to a failover, where, as used herein, the term "failover" refers to switching to a redundant or standby (i.e., auxiliary) application, computer server, system, hardware component, virtual machine or network upon the failure or abnormal termination of the previously active (i.e. primary) application, computer server, system, hardware component, virtual machine or network. State replication between different VNF instances of a VNF pool assisted by the interface element as described herein allows fast recovery in case the primary VNF instance fails because the pool user only needs to receive a handle to one of the other VNF instances in the VNF pool. It is no longer necessary for the pool user to restore the state in the newly selected VNF instance because the state of the failed VNF instance, which was the primary VNF instance prior to the failure, has already been replicated on the newly selected VNF instance.

While embodiments of the present invention are mainly described herein with reference to a failover, a person skilled in the art will recognize that replicating a state of one VNF instance on at least one other VNF instance of the VNF pool provides advantages also in the absence of any failures in the VNF instances. For example, having a state of one VNF instance replicated to at least one other VNF instance allows quickly switching a service provided by the former VNF instance to the latter VNF instance, e.g. when the latter VNF instance has more capacity in case of a near overload situation, or when sharing a service between two VNF instances.

Implementation of the interface element as described herein provides a faster, more transparent and resource-efficient mechanism for replicating a state of one VNF instance of a VNF pool to one or more other VNF instances of the VNF pool in all scenarios where such state replication may be desired, especially, for the configuration-intensive VNF instances.

In an embodiment, the VNF instances may include two or more VNF instances, preferably three or more VNF instances. The step of the interface element providing the control message at least to the first VNF instance and the second VNF instance may then comprise providing the control message to at least two, but preferably to all, of the VNF instances of the VNF pool. In such an embodiment, the method may further include steps of the interface element identifying VNF instances of the two or more VNF instances of the VNF pool from which the interface element did not receive an acknowledgement of the control message, and providing an indication of the identified VNF instances to a VNF pool registrar (PR-H) with which the VNF instances of the VNF pool are registered. Providing the VNF pool having three or more VNF instances allows the possibility of replicating the state of the first VNF instance on larger numbers of different VNF instances, thus increasing the reliability in case switching from the first VNF instance to some other VNF instance is necessary. The interface element not receiving an acknowledgment of the control message provided to one of the VNF instances indicates that the state of the first VNF instance may not have been replicated on such VNF instances. Identifying such VNF instances and sharing this information with the VNF pool registrar allows the interface element to update the VNF pool considered by the VNF pool registrar (i.e., update which VNF instances are to be considered to be "in the pool") so that, in case of a switch, the VNF pool registrar would not provide a handle to one of the VNF instances on which the state of the first VNF instance may not have been replicated.

In an embodiment, the method may further include a step of the interface element establishing a base communication channel, preferably a TCP channel, between the interface element and each of the control entity, the first VNF instance, and the second VNF instance. As used herein, the term "base communication channel" is used to describe either a bi-directional physical (e.g., a wire) medium or a bi-directional logical medium (which can be multiplexed on a physical medium) between two endpoints over which messages can be exchanged in either direction, for example using binary-encoded datagrams. Communication over a base communication channel might be susceptible to eavesdropping (a so-called "man in the middle" attack), where an attacker would make independent connections with both end-points and relay messages between them without informing the end points.

Establishment of such base communication channels allows the interface element to obtain the control messages sent by the control VNF to one of the VNF instances and provide the obtained control messages to other VNF instances.

In one embodiment, the base communication channels may be established using a three-way handshake as known in the art, e.g. a 3-way TCP-like handshake. Such an embodiment provides the advantage of providing a reliable, ordered and error-checked delivery of a stream of octets between two processes interconnected via the communication medium.

In one further embodiment to that involving establishment of a base channel, the VNF instances of the VNF pool may include two or more VNF instances, preferably three or more VNF instances, and the step of the interface element establishing the base communication channel may include establishing the base communication channel between the interface element and each of the at least two, but preferably of all, of the VNF instances of the VNF pool. In such an embodiment, the method may further comprise steps of the interface element identifying VNF instances of the VNF pool with which the base communication channel could not be established and/or was broken, and the interface element providing an indication of the identified VNF instances to a VNF pool registrar (PR-H) with which the VNF instances of the VNF pool are registered. Such an embodiment provides the advantage that any failure in the establishment and/or operation of a base communication channel may serve as an indication to the VNF pool registrar to exclude some VNF instances from the VNF pool because a state of the first VNF instance cannot be successfully replicated on a VNF instance with which a base communication channel has not been established and/or was broken. In this manner, in case switching from one VNF instance to another VNF instance or load sharing between two VNF instances is necessary, the VNF pool registrar would not provide a handle to one of the VNF instances on which the state of the first VNF instance may not have been replicated due to errors in the base communication channel(s).

In an embodiment, the method may further include a step of the interface element establishing a secure communication channel over the base communication channel established between the interface element and each of the control entity, the first VNF instance, and the second VNF instance (and preferably all VNF instances in the pool).

As used herein, the term "secure communication channel" is used to describe a communication channel such as the base communication channel described above, which is also confidential and authentic. A confidential channel provides a way of transferring data that is resistant to eavesdropping (i.e., reading the content), but not necessarily resistant to tampering. An authentic channel provides a way of transferring data that is resistant to tampering but not necessarily resistant to eavesdropping. Thus, a secure communication channel is resistant to both eavesdropping and tampering.

Establishing a secure communication channel advantageously allows securing the data exchanged between the interface element and the control VNF as well as the data exchanged between the interface element and the VNF instances. In this manner, multipoint connectivity is possible between the control entity and the individual VNF instances resistant to overhearing and tampering. The interface element can as such be considered as a trusted man in the middle to facilitate secure connectivity between the VNF instances and the control entity.

As used herein, the expression "interface element establishing a communication channel", applicable to both the base channel and the secure channel refers only to the fact that the interface element participates in the establishment of the channel and does not indicate which entity initiates such an establishment. In some embodiments it could be that the interface entity initiates establishment of a particular communication channel, while in others some other entity could do that, e.g. the control entity described herein.

In one further embodiment, the secure communication channel(s) could comprise SSL/TLS-based channel(s). This embodiment advantageously allows using standardized handshake process, such as e.g. a SSL-based 4-phase handshake, to establish the secure channels between the interface element and each of the control VNF and the different VNF instances.

In another further embodiment, the secure communication channel between the interface element and each of the control entity, the first VNF instance, and the second VNF instance could be established substantially in parallel. This embodiment provides the advantage of accelerating the establishment of multipoint connectivity between the control entity and the individual VNF pool instances resistant to overhearing and tampering. In an embodiment, the VNF instances could comprise two or more VNF instances, preferably three or more VNF instances, and the step of the interface element establishing the secure communication channel could comprise establishing the secure communication channel between the interface element and each of at least two, but preferably all, of the VNF instances of the VNF pool. In such an embodiment, the method may further include steps of the interface element identifying VNF instances of the VNF pool with which the secure communication channel could not be established and/or was broken, and providing an indication of the identified VNF instances to the VNF pool registrar with which the VNF instances of the VNF pool are registered. This embodiment may provide the advantage that any failure in the establishment and/or operation of a secure communication channel may serve as an indication to the VNF pool registrar to exclude from the VNF pool some VNF instances (namely, those VNF instances with which the secure communication channel could not be successfully established and/or was broken). Providing such an indication allows the interface element to update the VNF pool considered by the VNF pool registrar so that, in case switching from one VNF instance to another VNF instance or load sharing between two VNF instances is necessary, the VNF pool registrar would not provide a handle to one of the VNF instances which may not have been detected due to the absence of the secure communication channel.

According to another aspect of the present invention, a data processing system and a node (i.e., a device or a network entity such as e.g. 3GPP P-GW, S-GW of the Service Provider cellular telecommunications network) for carrying out method steps as described herein are provided. Each of the data processing system and the node comprise at least a processor configured to carry out method steps described herein. Such a data processing system could be included within the node.

According to yet another aspect of the present invention, a system is disclosed. The system may include a VNF pool comprising a plurality of VNF instances which include at least a first VNF instance (VNF i1) and a second VNF instance (VNF i2), a control entity configured to control the VNF instances of the VNF pool, and an interface entity communicatively connected to the VNF instances and to the control entity, the interface entity comprising at least a processor configured to carry out method steps described herein. In an embodiment, such a system could further include the VNF pool registrar with which the VNF instances of the VNF pool are registered, the VNF pool registrar communicatively connected to the interface element and configured to at least receive from the interface element the VNF instances identified by the interface element according to the different embodiments described above. In one further embodiment, the VNF pool registrar could further be configured to provide to a pool user a handle to the second VNF instance in case of a failure or improper operation of the first VNF instance and/or in case of load sharing between two or more VNF instances to be used in the data plane. The pool user could subsequently re-configure the network to use the alternate VNF instance.

The disclosure may also relate to a computer program, implemented on computer-readable storage medium, and to a computer-readable storage medium, preferably non-transitory, storing such a computer program. The computer program may comprise software code portions configured for, when run on a computer, executing the method steps according to any of the methods described in the present disclosure.

The disclosure will further be illustrated with reference to the attached drawings, which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
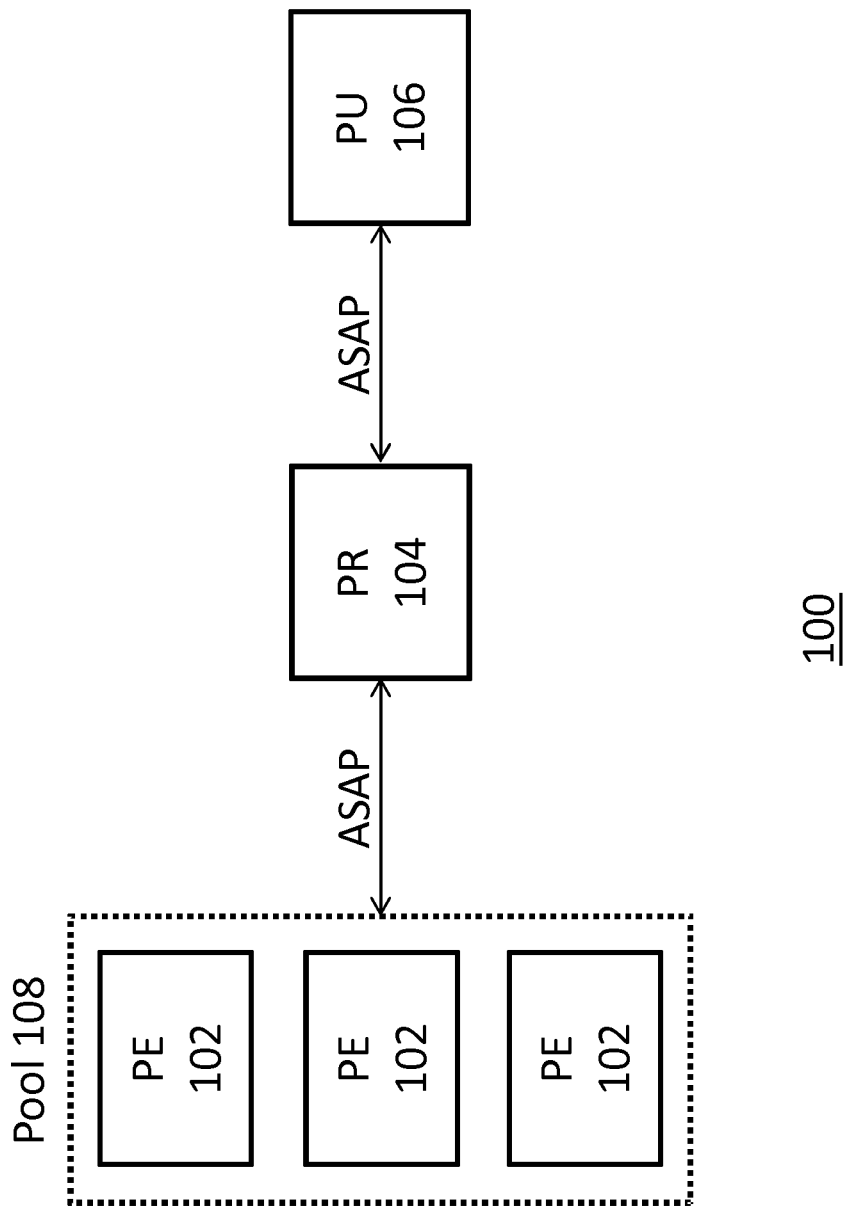
FIG. 1 provides a schematic illustration of a RSerPool architecture, according to the state of the art.
Figure 2:
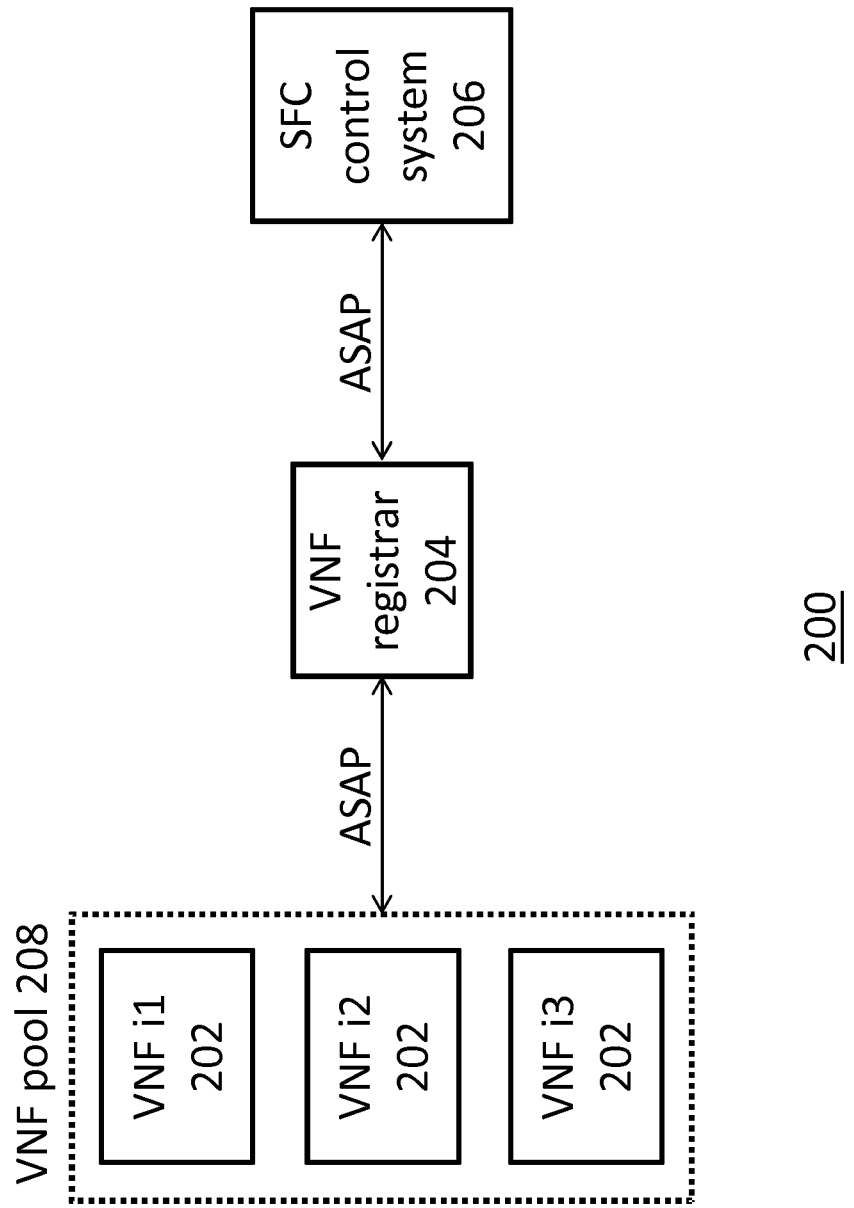
FIG. 2 provides a schematic illustration of a VNF pool architecture following the RSerPool architecture shown in FIG. 1.
Figure 3:
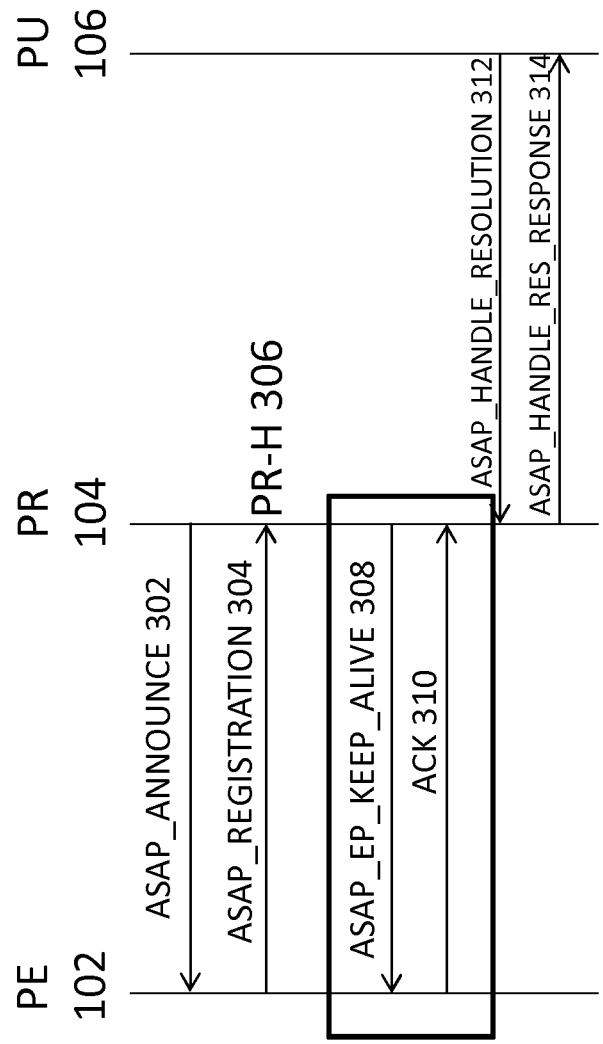
FIG. 3 provides a schematic illustration of a bootstrapping process of a VNF pool as inherited from the RSerPool architecture of FIG. 1 and applicable to the VNF pool architecture of FIG. 2.
Figure 5:
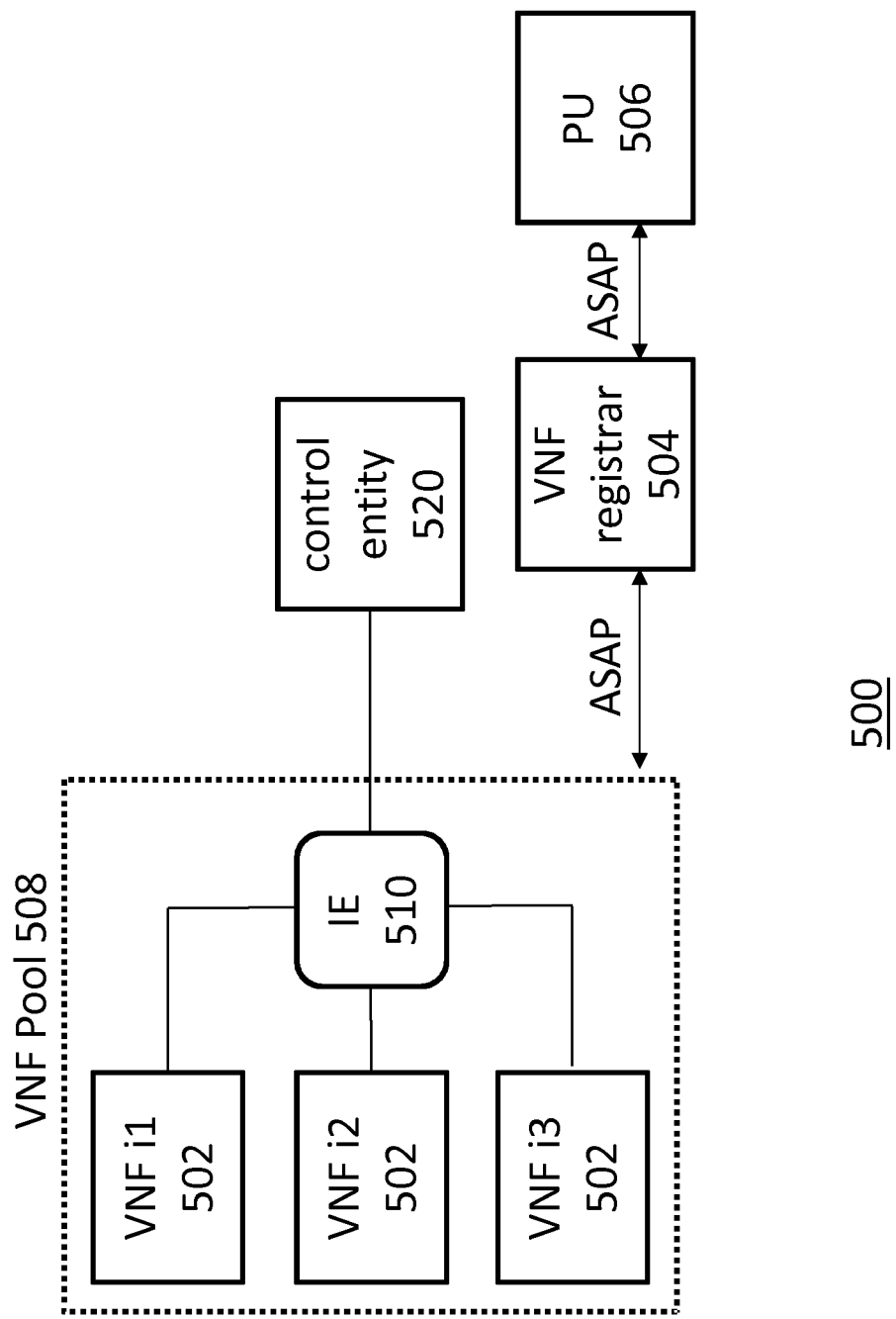
FIG. 5 provides a schematic illustration of a VNF pool architecture, according to one embodiment of the present invention.

FIG. 5 provides a schematic illustration of a VNF pool architecture 500, according to one embodiment of the present invention. Similar to the architecture 200 described above, the VNF pool architecture 500 utilizes three types of components: 1) a plurality of pool elements 502, shown as three VNF instances 502: VNF i1, VNF i2, and VNF i3, 2) a pool registrar, shown as VNF registrar 504, and 3) a pool user, shown as PU 506. Each one of the VNF instances 502 could be a server. The VNF instances 502 all perform the same network function and together may form a VNF pool 508. While the pool 508 shown in the example of FIG. 5 as comprising three instances of the pool elements, embodiments of the present invention are applicable to any number of pool elements equal to or greater than two. The PU 506 is a client, such as e.g. SFC control system, using the service of the pool 508. The VNF registrar 504 is configured to perform registration and management functions of the VNF instances 502 of the pool 508 and provides handles to individual VNF instances 502 to the PU 506 as is currently done in the art and as summarized above for the PR component in association with FIG. 1 and for the VNF registrar component in association with FIG. 2. The VNF instances 502 of the VNF pool 508, the VNF registrar 504, and the PU 506 may communicate with one another using ASAP, as shown with the double arrows between these elements.

The architecture 500 also illustrates a control entity 520, which is a control/management entity which itself could be, but does not have to be, a VNF, in charge of controlling the VNF instances 502. As described above, the state of the VNF instances 502 is determined by the control messages communicated from the control entity 520 to each one of the VNF instances 502. Examples of the network functions implemented as VNF instances controlled by a control entity provided above are applicable here and, therefore, are not repeated.

The architecture 500 is further characterized by comprising an interface element 510. The interface element 510 provides an interface between the VNF instances 502 of the VNF pool 508 and the control entity 520 in that it can obtain messages from the control entity 520 destined for one of the VNF instances 502 and then provide the obtained control messages to the respective VNF instance as well as to other VNF instances within the VNF pool 508. In this manner, the interface element 510 serves as a logical VNF interface between the control entity 520 and the individual VNF instances 502. This is illustrated in the messaging diagram of FIG. 6 described below.

While FIG. 5 illustrates a single control entity 520 from configuration or interaction with which the state of a particular VNF instance is established, this may not always be the case. In other words, not necessarily a state of a VNF instance can be reduced to interactions with a single control entity. In such a case, the same principles as described herein for the control entity 520 can be applied for all other interfaces of the VNF instances, where the interface element 510 would again serve as a logical VNF interface.

Figure 6:
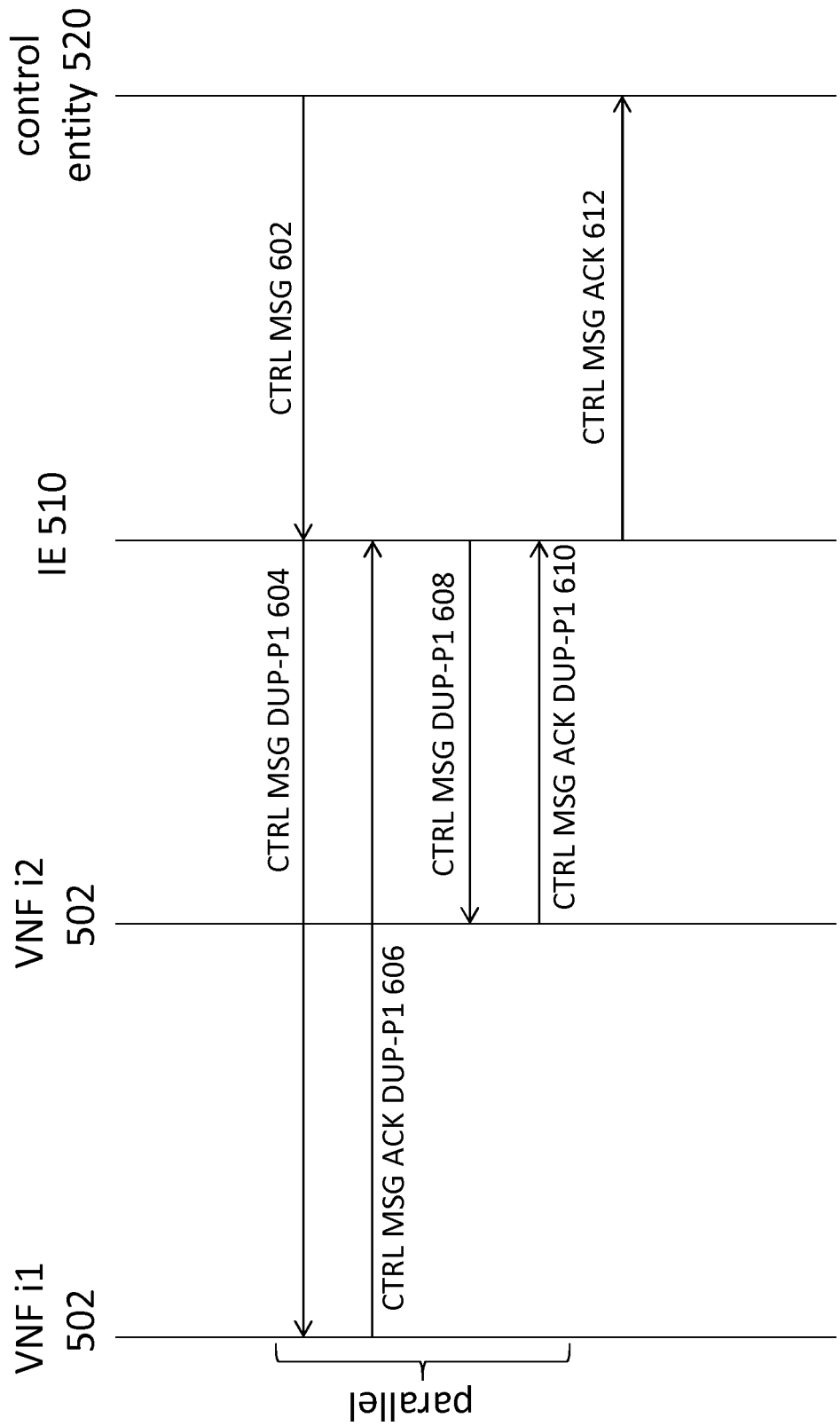
FIG. 6 provides a schematic illustration of replicating a state of a first VNF instance on a second VNF instance, according to one embodiment of the present invention.

As shown in FIG. 6, first the interface element 510 obtains a control message 602. Consider that at that time the active VNF instance, i.e. the VNF instance for which the VNF registrar 504 provided a handle to the PU 506, is VNF i1 and the message 602 was sent by the control entity 520 to the VNF i1. The interface element 510 may obtain such a control message in a number of different ways, all of which are within the scope of the present invention. For example, the interface element 510 may intercept the message 602 through a datagram received from physical point-to-point or multi-point medium (LAN). In another example, the interface element 510 may receive the message 602 from the control entity 520 (i.e., the control entity 520 intentionally transmits the message 602 for the VNF i1 to the interface element 510) because there is an established base communication channel, such as a TCP channel, between the interface element 510 and the control entity 520. The interface element 510 may then provide the control message 602 not only to the VNF i1 to which the message was destined in the first place, but also to at least one other VNF instance of the VNF pool 508. This is shown in FIG. 6 with the interface element 510 providing a copy of the message 602, a message comprising the message 602, or a message indicative of the receipt and/or indicative of the content of the message 602 to the first and second VNF instances as messages 604 and 608, respectively. By providing the message 602 destined for one VNF instance to that and at least one other VNF instance, the interface element 510 enables replication of the state of the first VNF instance on the second VNF instance.

In an embodiment, the interface element 510 may be configured to provide the messages 604 and 608 substantially in parallel.

At some point after the provision of the message 604, the interface element obtains an acknowledgement from the first VNF instance that the first VNF instance received the message 604. Similarly, at some point after the provision of the message 608, the interface element obtains an acknowledgement from the second VNF instance that the second VNF instance received the message 608. The acknowledgements from the first and second VNF instances are illustrated in FIG. 6 as messages 606 and 610, respectively.

Once the interface element 510 has the acknowledgements from both the first and the second VNF instances that they have received the messages 604 and 608, respectively, it provides an acknowledgement message 612 to the control entity 520, thus indicating that a state of the first VNF instance is replicated on the second VNF instance because they have successfully received the same control message. Since the interface element 510 obtains control messages from the control entity 520 and returns acknowledgements to the control entity, it acts as a logical VNF interface for the control entity 520.

A person skilled in the art would realize that besides receiving explicit acknowledgement messages 606 and 610, there are other ways for the interface element 510 to have such acknowledgements, all of which are within the scope of the present invention. For example, in line with the TCP (i.e. when there is a base TCP channel between the interface entity 510 and each of the first and second VNF instances), when CTRL_MSGs<n> 604 and 608 get a sequence number (n), instead of explicitly acknowledging these messages with messages 606 and 610, respectively, the respective VNF instance may acknowledge the receipt implicitly e.g. by sending a message "I am ready to receive CTRL_MSG<n+1>". In another example, if the control message 602 was of the format "set rule X=< . . . >" then the messages 606 and 610 returned to the interface element 510 from each of the VNF instances could be of the format "report: rule X=< . . . >". In yet another example, when there are no explicit or implicit acknowledgment messages sent to the interface element 510, the interface element may be configured to obtain such acknowledgements by requiring the control entity 520 to poll explicitly for the changed state to verify that it was changed. The interface element 510 would then be involved in the virtualization functionality by consolidating the response to this polling into a single message and, in the process, obtaining the desired acknowledgements. Embodiments are also possible where the interface element 510 obtains an acknowledgement from one VNF instance in one manner while obtaining an acknowledgement from another VNF instance in another manner.

Similarly to the discussion above, while the acknowledgment 612 is illustrated in FIG. 6 as an explicit acknowledgement message, in various embodiments the interface element 510 may be configured to provide such an acknowledgement in other forms, either explicit or implicit, e.g. in any of the ways described above.

While FIG. 6 illustrates replication of a state only for the first and second VNF instances of the VNF pool 508, in other embodiments where there are more VNF instances performing the same network function, such replication may be performed for more, and preferably for all, of these VNF instances. Then the interface element 510 may be configured to provide an indication to the VNF registrar 504 as to which VNF instances the state of the first VNF instance has been replicated, thus updating which VNF instances the VNF registrar 504 considers to be within the VNF pool 508. Preferably, the VNF instances to which it is possible that the state of the first VNF instance could not be replicated (e.g. because the interface element 510 did not obtain an acknowledgement as described in FIG. 6), are taken out of the VNF pool 508 in that the VNF registrar would not provide a handle to such VNF instance to the PU 506.

Replicating a state of one VNF instance on at least one other VNF instance by automatically duplicating control commands as described above makes sure that the states of these VNF instances are in sync from the moment their configuration changes, without actively needing to send messages between either the VNF instances and the PU 506 or between the VNF instances themselves. In such a case, from the moment a handle to a new VNF instance needs to be provided to the PU 506 (either instead of or in addition to the old handle provided), the VNF registrar 504 may immediately select any of the handles to the VNF instances that the registrar considers to form the pool 508 because the state of the previously active VNF instance has already been replicated to these VNF instances. This allows faster failover, switching, or load sharing as well as improves the overall network resource usage.

Reliable communication between the interface element 510 and the control entity 520 and between the interface element 510 and each of the VNF instances in the pool participating in state replication may be achieved by establishing base communication channels between these components e.g. in the form of TCP channels. By further establishing a secure communication channel, such as e.g. SSL/TLS channel, over the base communication channel, security in exchanging data between the entities involved may be guaranteed. Thus, in an embodiment, the interface element 510 may be configured to establish a base communication channel with the control entity 520 in order to ensure reliability and, preferably, also establish a secure communication channel with the control entity 520 in order to ensure security. Similarly, the interface element 510 may be configured to establish a base communication channel and, preferably, a secure communication channel, with each of the individual VNF instances to be participating in replication by setting up individual communication sessions with these instances.

Figure 7:
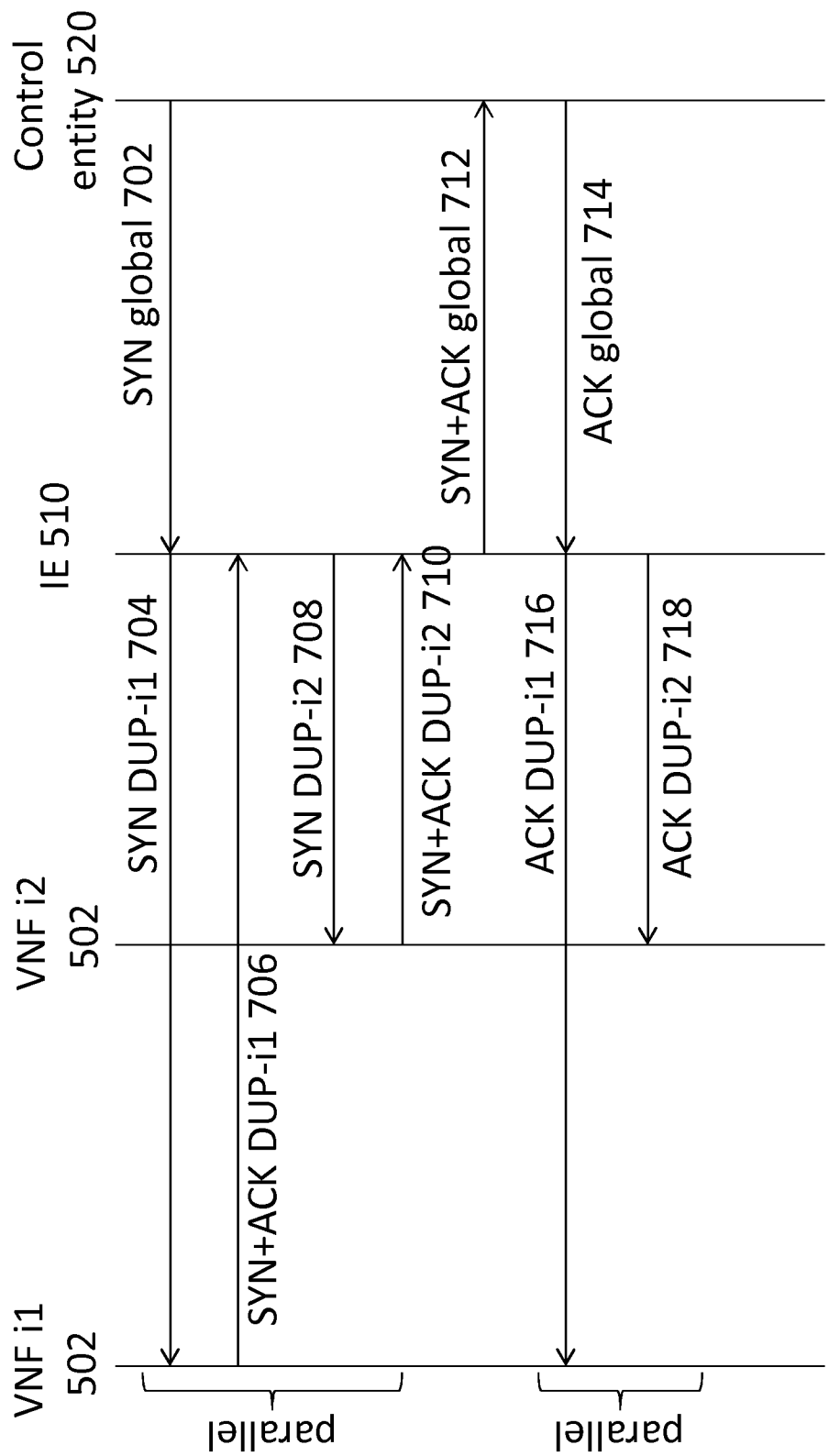
FIG. 7 provides a schematic illustration of a bootstrapping process for setting up individual base communication channels, according to one embodiment of the present invention.

FIG. 7 provides a schematic illustration of a bootstrapping process for setting up individual base communication channels, according to one embodiment of the present invention.

The setup of a channel usually involves a handshake-like mechanism. FIG. 7 illustrates a particular example of a process for a TCP-like three-way handshake. In the example shown in FIG. 7 it is assumed that the establishment of the base connection is initiated by the control entity 520 by sending a SYN message 702 towards the primary VNF instance of which it is in control. Continuing with the example of FIG. 6, the first VNF instance VNF i1 is considered to be the primary VNF instance. As the network function performed by the first VNF instance is implemented redundantly through the VNF pool 508, the SYN message is processed by the interface element 510 which, again, acts as the logical VNF interface. Next, the interface element 510 initiates a mirrored SYN message towards at least the first and the second, but preferably all, VNF instances 502 of the VNF pool 508. Preferably, this process happens in parallel. The duplicated SYN messages towards the first and second VNF instances are shown n FIG. 7 as messages 704 and 708, respectively.

In response of this SYN message, the respective VNF instances reply with a SYN+ACK message towards the interface entity 510, shown in FIG. 7 for the first and second VNF instances as messages 706 and 710, respectively. When a SYN+ACK message is received by the interface element 510 at least from the first and second VNF instances, but preferably by all VNF instances of the VNF pool 508, the interface element 510 returns a SYN+ACK message 712 towards the control entity 520 to enter the second phase of the handshake. The latter triggers the control entity 520 to reply with a final ACK message 714 towards the interface element 510. On the level of the interface element 510 initiating establishment of base communication channels with the individual VNF instances, an ACK is now sent from the interface element 510 towards the individual VNF instances as last phase of the handshake, shown in FIG. 7 for the first and second VNF instances as messages 716 and 718, respectively.

When a SYN+ACK message is not received by the interface element 510 from at least the first and second VNF instances or when it is not received from all VNF instances to which the SYN message was provided, the interface element 510 may determine that the handshake process failed and the VNF protection mechanism is not bootstrapped and, preferably, provide an indication of this to the control entity 520. The process of establishing of the base communication channels could then be repeated.

In an embodiment, the interface element 510 may be configured to provide an indication of a failure at any point in establishment of the base communication channel to the VNF registrar 504. In turn, the VNF registrar may consider updating which VNF instances 502 it considers to be comprised within the VNF pool 508. For example, if an acknowledgement of the SYN message was not received from one of the VNF instances the interface element 510 duplicated the SYN message to, the interface element could identify such a VNF instance and provide this information to the VNF registrar 504 which would then exclude that VNF instance from the VNF pool 508.

Once the base communication channel such as the TCP connection illustrated in FIG. 7 has been set up, a secure communication channel such as e.g. a SSL/TLS-based channel may be set up on top of the base channel in a higher layer handshake mechanism. Again, the proposed solution aims to set up a secure channel between at least two, but preferably all, VNF instances of the VNF pool 508 and the interface element 510, as well as between the interface element 510 and the control entity 520. This requires that every node involved, i.e. the VNF instances 502, the control entity 520 and the interface element 510, has a private/public key pair and a certificate that signs that public key. In various embodiments, these keys might be self-generated and self-signed by the individual VNF instances, or might be received in interaction with a trusted certificate authority. In this setup, the key pair of the interface element 510 may represent the key pair of the logical VNF with which the control entity 520 interfaces.

Figure 8:
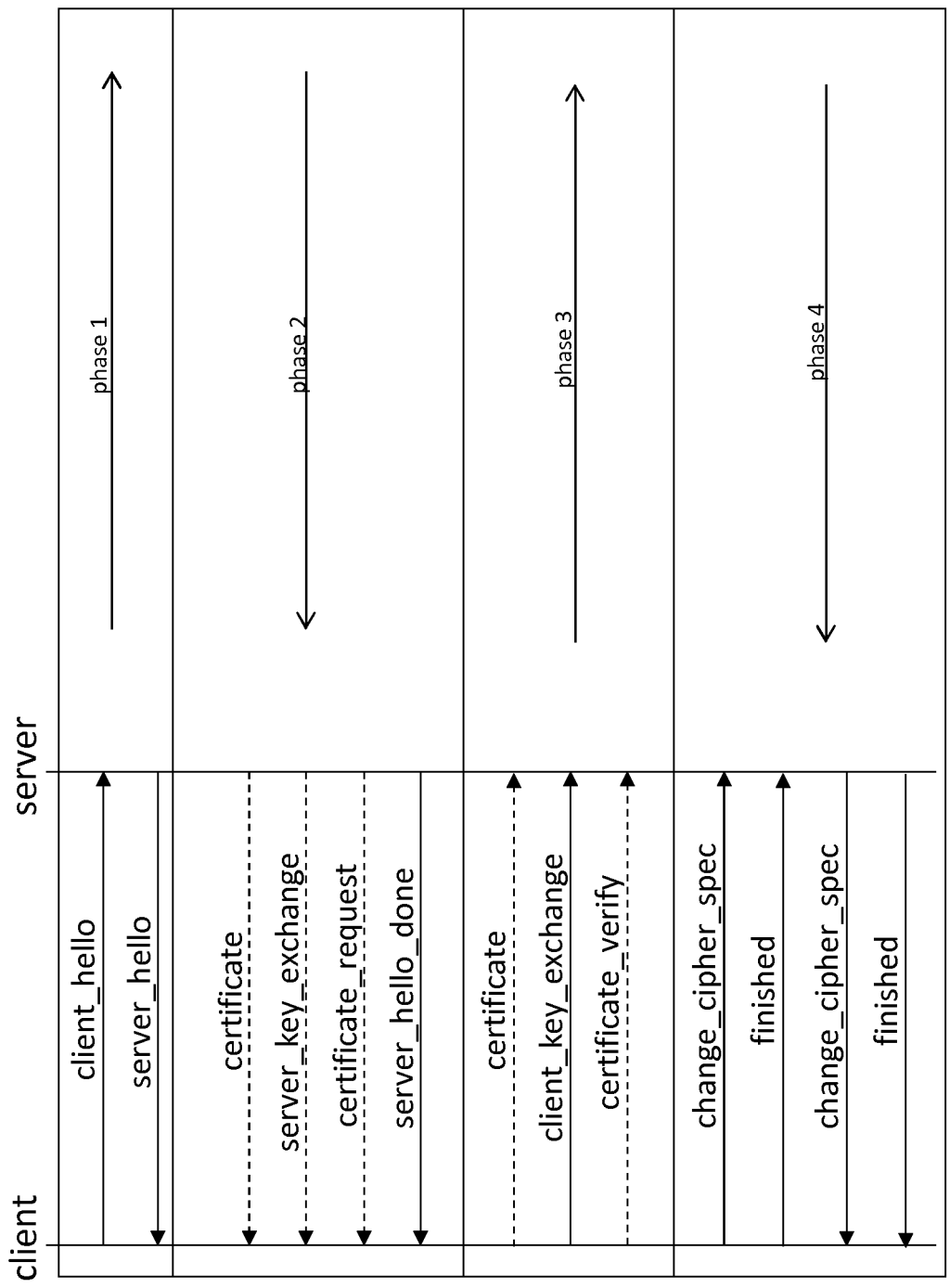
FIG. 8 illustrates the existing, standardized SSL-based 4-phase handshake process between a client and a server process.

FIG. 8 illustrates the existing, standardized SSL-based 4-phase handshake process between a client and a server. As shown in FIG. 8, the hello messages (phase 1) involve negotiation of the session ID, key exchange algorithm, MAC algorithm, encryption algorithm, and exchange of initial random number. Next, the server may send its certificate and key exchange message, and it may request the client to send a certificate. Server then signals the end of hello phase (phase 2). Subsequently, the client sends certificate if requested and may send an explicit certificate verification message and the client always sends its key exchange message (phase 3). Finally, the cipher spec is changed and the handshake is finished (phase 4). As a person skilled in the art would recognize, the cipher spec may specify a bulk data encryption algorithm, such as e.g. DES, and a hash algorithm, such as e.g. MD5 or SHA-1, and may define cryptographic attributes such as a hash size. In FIG. 8, the dashed lines indicate that the message is optional, while the solid lines indicate that the message is mandatory for the handshake to be successful.

Figure 9:
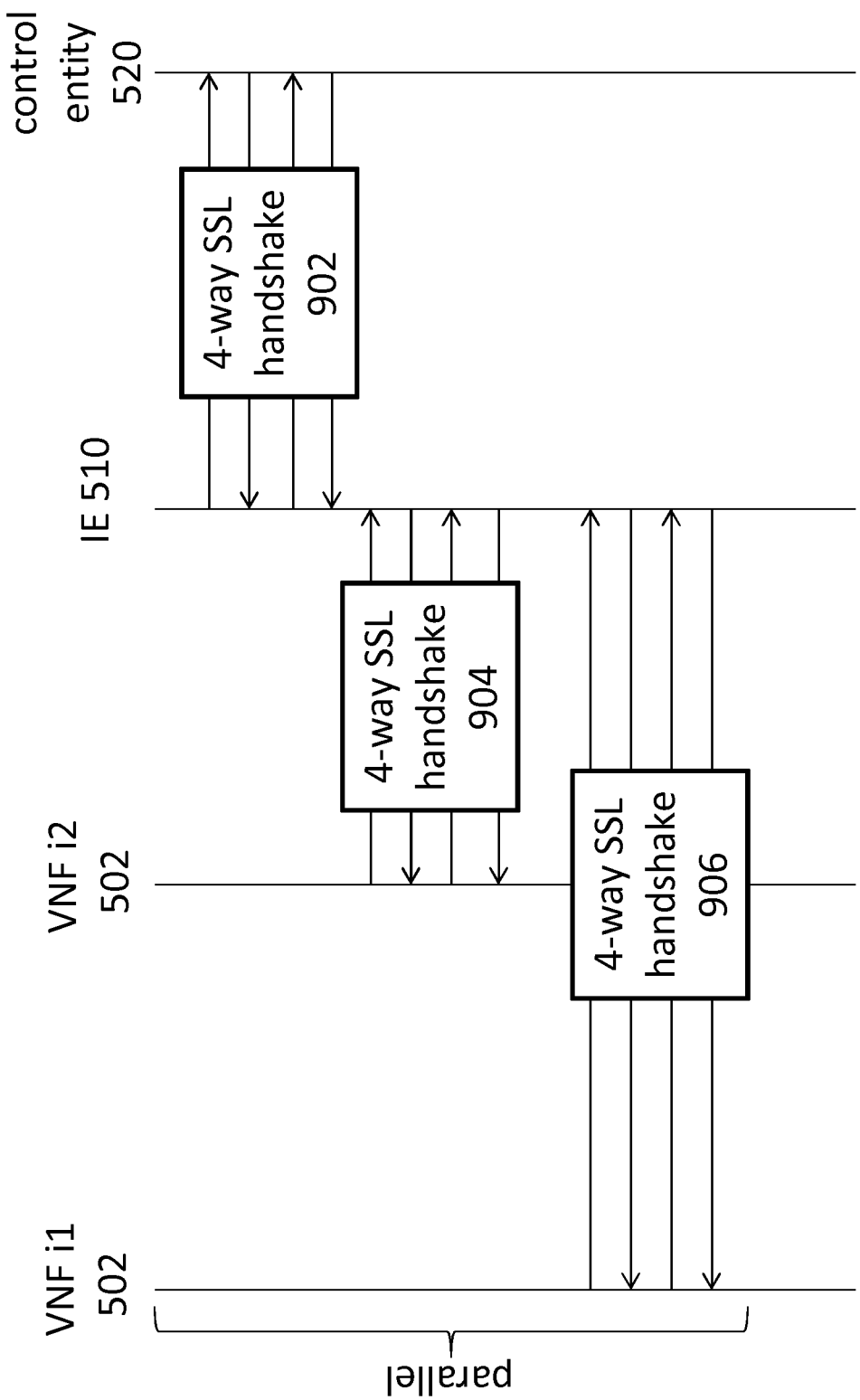
FIG. 9 provides a schematic illustration of setting up individual secure communication channels, according to one embodiment of the present invention.

FIG. 9 provides a schematic illustration of setting up individual secure communication channels, according to one embodiment of the present invention. In particular, FIG. 9 illustrates a parallel setup of three secure SSL-channels, each following the 4-phase handshake mechanism as depicted in FIG. 8. One channel is between the control entity 520 and the interface element 510, where the 4-phase handshake mechanism of FIG. 8 is indicated as a 4-way SSL handshake 902. Another channel is between the first VNF instance VNF i1 and the interface element 510, where the 4-phase handshake mechanism of FIG. 8 is indicated as a 4-way SSL handshake 906. The third channel is between the second VNF instance VNF i2 and the interface element 510, where the 4-phase handshake mechanism of FIG. 8 is indicated as a 4-way SSL handshake 904.

As described above for the base communication channel, in an embodiment, the interface element 510 may be configured to provide an indication of a failure at any point in establishment of the secure communication channel to the VNF registrar 504. In turn, the VNF registrar may consider updating which VNF instances 502 it considers to be comprised within the VNF pool 508.

In a preferred embodiment, the replication mechanism described in association with FIG. 6 is only performed once the bootstrapping process of setting up the base communication channel as described for FIG. 7 and preferably also the secure communication channel as described for FIG. 9 has successfully been executed (i.e., when the control channels are considered as active).

Figure 4A:
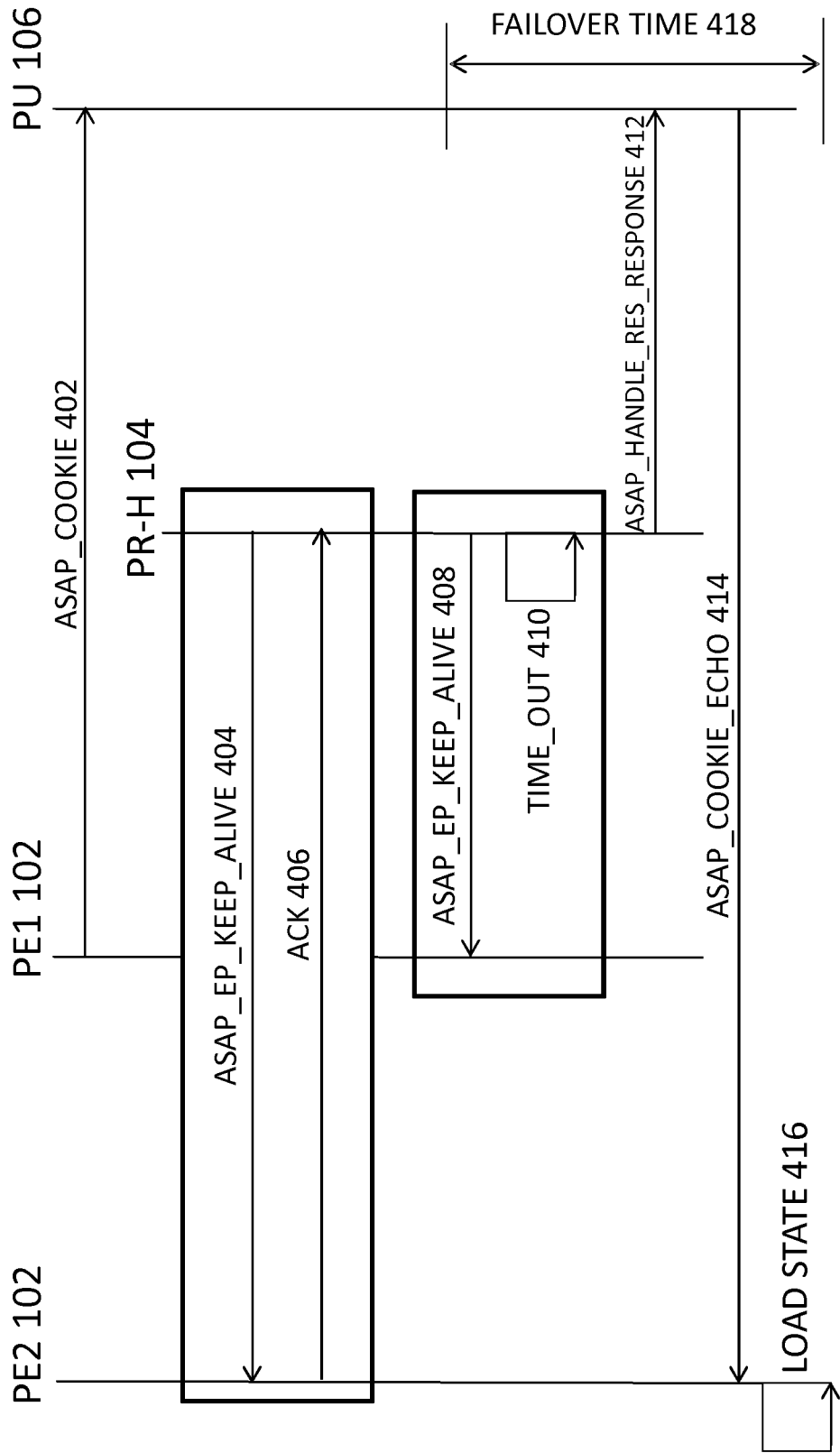
FIG. 4A provides a schematic illustration of a default failover process with state replication between different VNF instances of the same pool relying on regular exchange of cookie messages between the active VNF instance and the PU.

Unlike the state of the art, the proposed solutions require no additional bandwidth between the VNF instances 502 and the PU 506 for state replication, as no cookie messages are required. In addition, the resulting process of switching to or activating a new VNF instance in the proposed solutions can now be significantly quicker. These advantages can be seen by returning back to FIG. 4A and noting that the failover process with state replication between different VNF instances of the same pool relying on the use of the architecture 500 as described above would not require steps 402, 414, and 416. The rest of the description of the failover process provided for FIG. 4A would be applicable for the architecture 500, with the PE 1 replaced with VNF i1, PE 2 replaced with VNF i2, PR-H 104 replaced with VNF registrar 504, and PU 106 replaced with PU 506, which illustration and description therefore not repeated here. From the time when the connectivity towards PE1 fails, i.e. from the timeout of keep-alive, the VNF registrar 504 can notify the PU 506 with a handle towards the second VNF instance VNF i2. From the moment this message is received by the PU 506, the failover can be considered as finished, because the state of the VNF i1 has already been continuously replicated on the VNF i2 as a result of the processes described above.

Figure 4B:
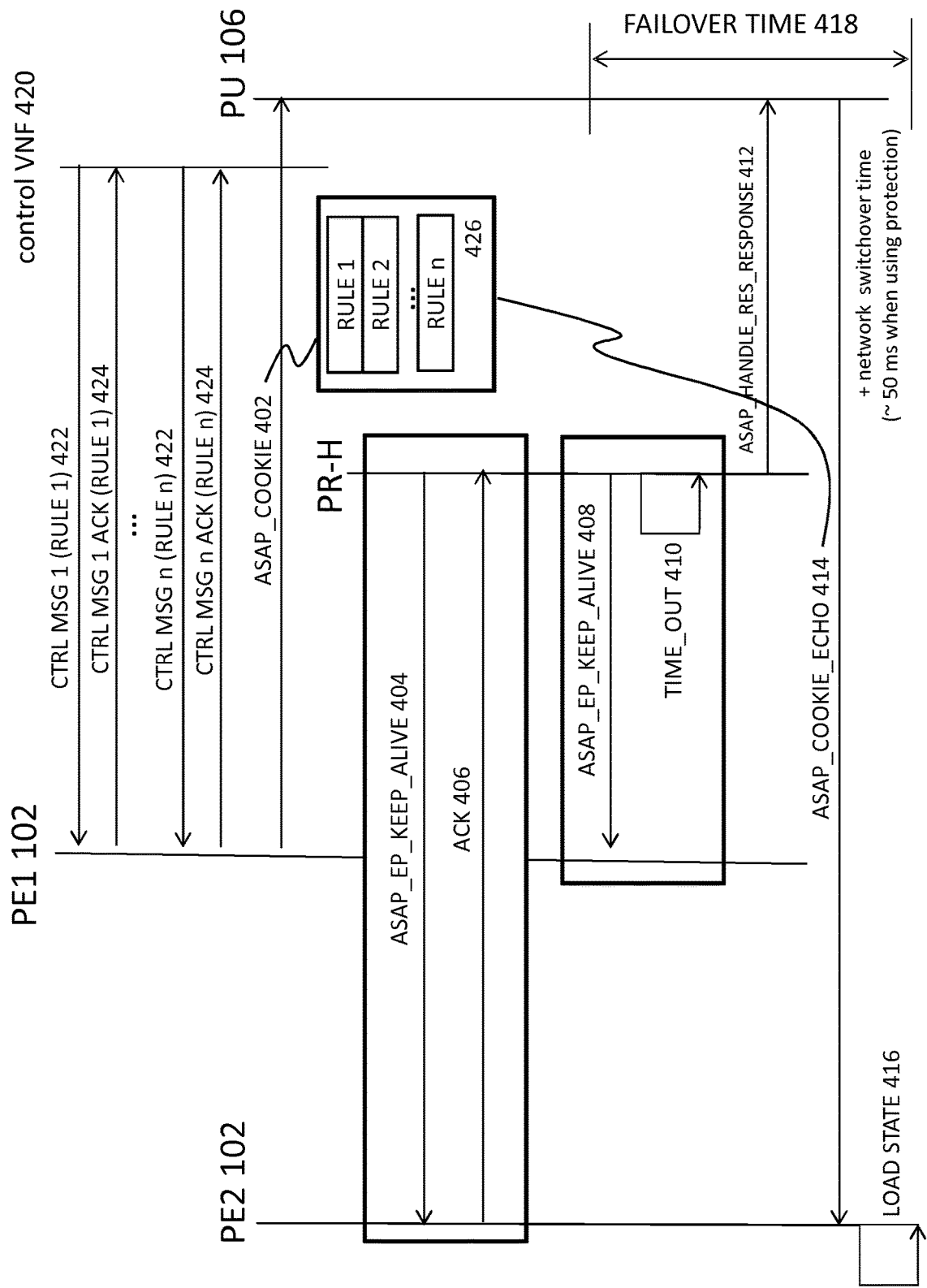
FIG. 4B provides a schematic illustration of a default failover process of FIG. 4A when the state of the different VNF instances is defined by control messages provided to the respective VNF instances by a control entity.
Figure 10:
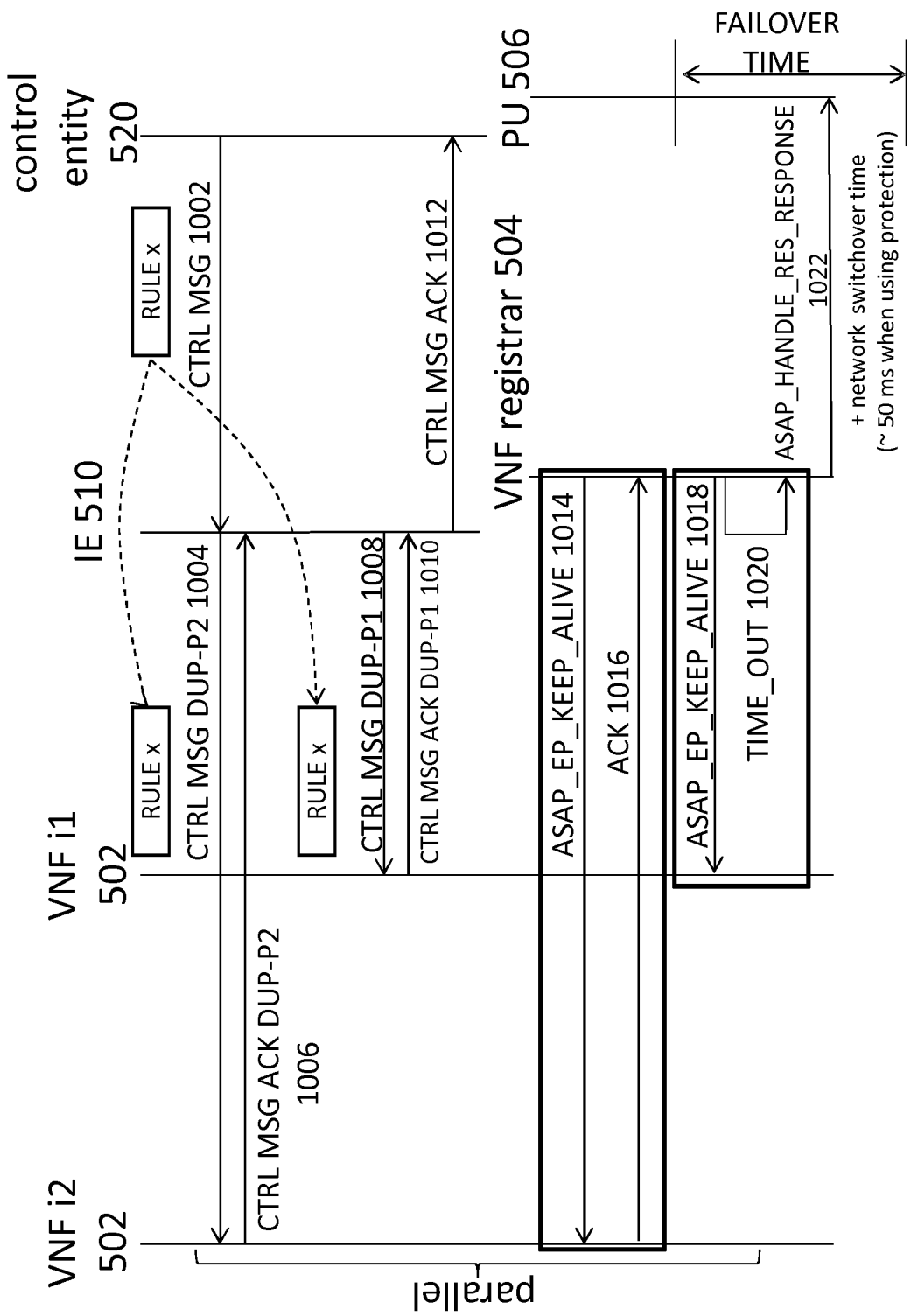
FIG. 10 provides a schematic illustration of a failover process when the state of different VNF instances is defined by control messages provided to the respective VNF instances by a control entity, according to one embodiment of the present invention.

FIG. 10 provides a schematic illustration of a default failover process when the state of the different VNF instances 502 is defined by control messages provided to the respective VNF instances by the control entity 520, according to one embodiment of the present invention. FIG. 10 is comparable to FIG. 4B illustrating an analogous scenario according to the state of the art. Thus, FIG. 10 also illustrates a process in case the VNF instances 502 under consideration are OpenFlow-controlled network functions, such as e.g. an OpenFlow-firewall. As shown in FIG. 10 with message 1002, the control entity 520, in this case an OpenFlow controller, communicates new flow entries (e.g., RULE x) to the active VNF instance, i.e. the VNF instance for which the VNF registrar 504 provided a handle to the PU 506, in this example VNF i1, and the interface element 510 obtains the message. The interface element 510 duplicates this control information towards the individual pool elements, in this case OpenFlow switches, VNF i1 and VNF i2, shown with messages 1008 and 1004, respectively, in a manner as described in association with FIG. 6, with the communication channels established between the entities involved as described in association with FIGS. 7 and 9. Also as described above for FIG. 6, the interface element 510 sends an acknowledgement towards the control entity 520, shown in FIG. 10 with message 1012, only when the interface element 510 has the acknowledgements from the VNF instances VNF i1 and VNF i2, shown in FIG. 10 with explicit messages 1010 and 1006, respectively. As described above, this process ensures that the state of the individual pool elements VNF i1 and VNF i2 is always in sync. Meanwhile, the keep-alive process between the VNF registrar 504 (PR-H) and the VNF instances i1 and i2 monitors if these pool elements are still properly operating, shown in FIG. 10 with messages 1018 and 1014, respectively. Upon a failure of the primary pool element VNF i1, the corresponding keep-alive session times out (shown in FIG. 10 with step 1020), and the VNF registrar 504 updates the PU 506 (e.g., the SFC control system) with the new handle in the form of a handle to the VNF i2, shown in FIG. 10 with step 1022 (provided there was no failure with the pool element VNF i2, as shown in FIG. 10 with step 1016). This enables the PU 506 to re-provision the network/service function chain configuration with respect to the data plane. Because the state has been kept in sync continuously, the failover is finished as soon as the data plane switchover is finished, which involves reception of the handle update by the PU 506 and execution of the data plane switch-over in the network. As no additional state needs to be replicated anymore, the recovery may be immediate.

Because embodiments of the present invention could be used to enable hitless switch-over in the data plane, network protection techniques, i.e. pro-active provisioning of the backup path, could be used. In the case of protection, the network control system must know the handle of the backup VNF instance before the failure actually occurs, in order to be able to pre-provision the network path towards the backup VNF. The handles of alternative VNF instances could be exchanged for example through an extended handle message 314 from the VNF registrar (PR-H) towards the PU including: i) the active handle, and ii) the handles of the backup VNFs. As known in the art, when using network protection, a failure or/and an alarm indication signal is sent from the network control system (which could be the PU 506 itself, or a network control system which is directly notified by the PU 506) towards the branch points which need to switch over between primary and backup segment/path from the moment a failure is detected and notified from the PR-H towards the controlling instance (in this case the PU 506, e.g. the SFC control system).

Figure 11:
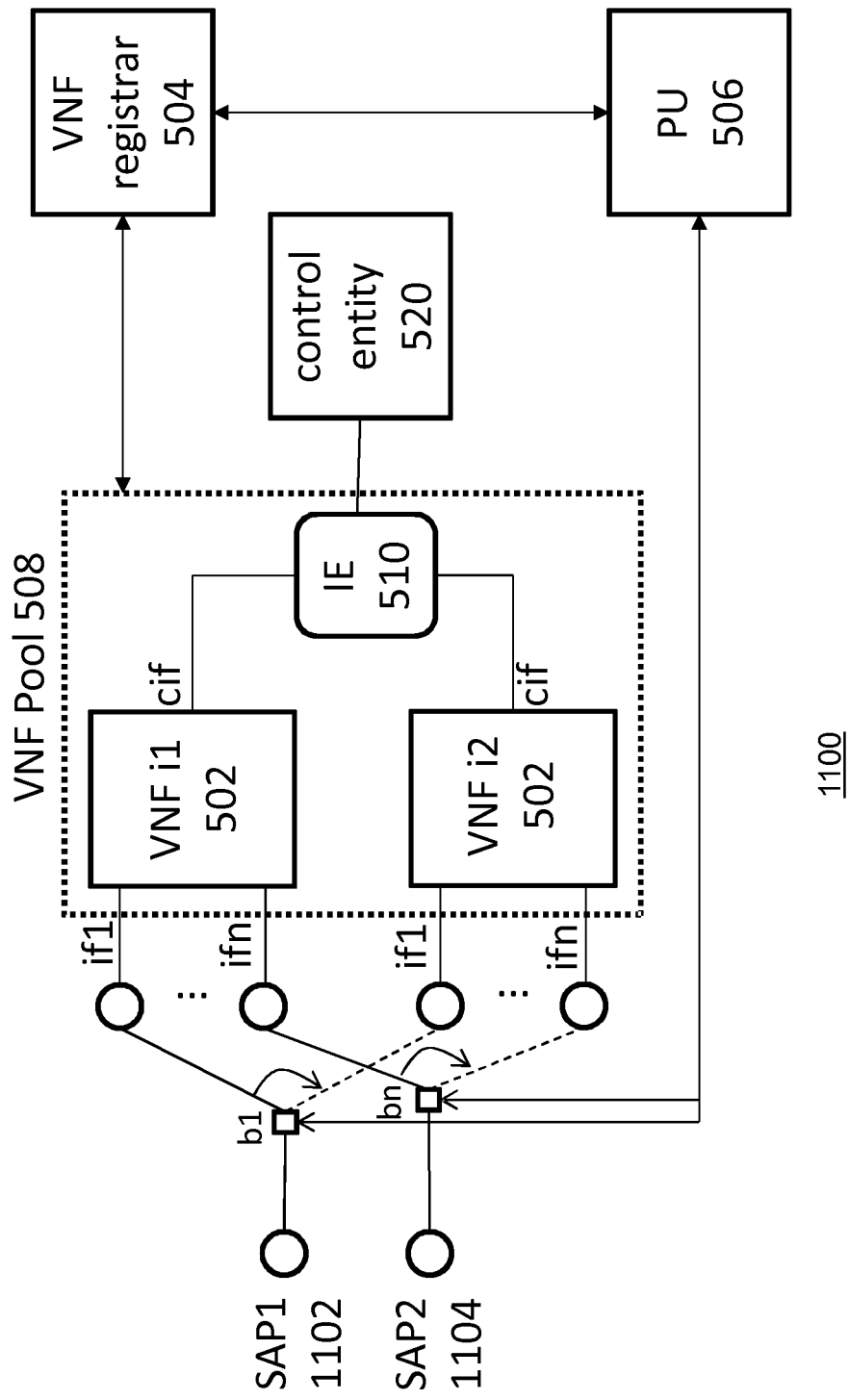
FIG. 11 provides a schematic illustration of a data plane architecture which could be used with the functionality of the interface element as described herein, according to one embodiment of the present invention.

Network protection techniques are known to deliver network recovery times in less than 50 ms. FIG. 11 provides a schematic illustration of a data plane architecture 1100 which could be used with the functionality of the interface element 510 as described herein, according to one embodiment of the present invention.

FIG. 11 illustrates a VNF pool 508 with two pool elements, a primary (first) VNF instance VNF i1 and a backup (second) VNF instance VNF i2. The control interface between the first and second VNFs 502 and the control entity 520 is handled by the interface element 510 as described above. In the data plane, each of the VNF i1 and VNF i2 may haven interfaces, shown in FIG. 11 as interfaces if1 to ifn, which are interconnected to n Service Attachment Points (SAP), shown in FIG. 11 as two SAPs—SAP1 1102 to SAP2 1104 via an interconnecting network. Part of the network path between the SAPs and the VNF interfaces of the primary and the backup VNF instances might be overlapping up to branch points shown in FIG. 11 as branch points b1 to bn, where b1 is the branch point for the network path to the first interface, up to bn, for the branch point of the network path to the n-th interface. One role of the PU 506 is to make sure that the network path towards the backup VNF instance will be provisioned, e.g., using OpenFlow control or Generalized/Multi-Protocol Label Switching (G/MPLS) signaling protocols. From the time the PU 506 is instructed to use an alternative VNF instance, it may take the action to change the network path between the SAPs towards the backup VNF. In the case of using protection techniques, this involves instructing the branch points to switch over towards the backup segments, i.e. switching using the dashed interconnections shown in FIG. 11.

Figure 12:
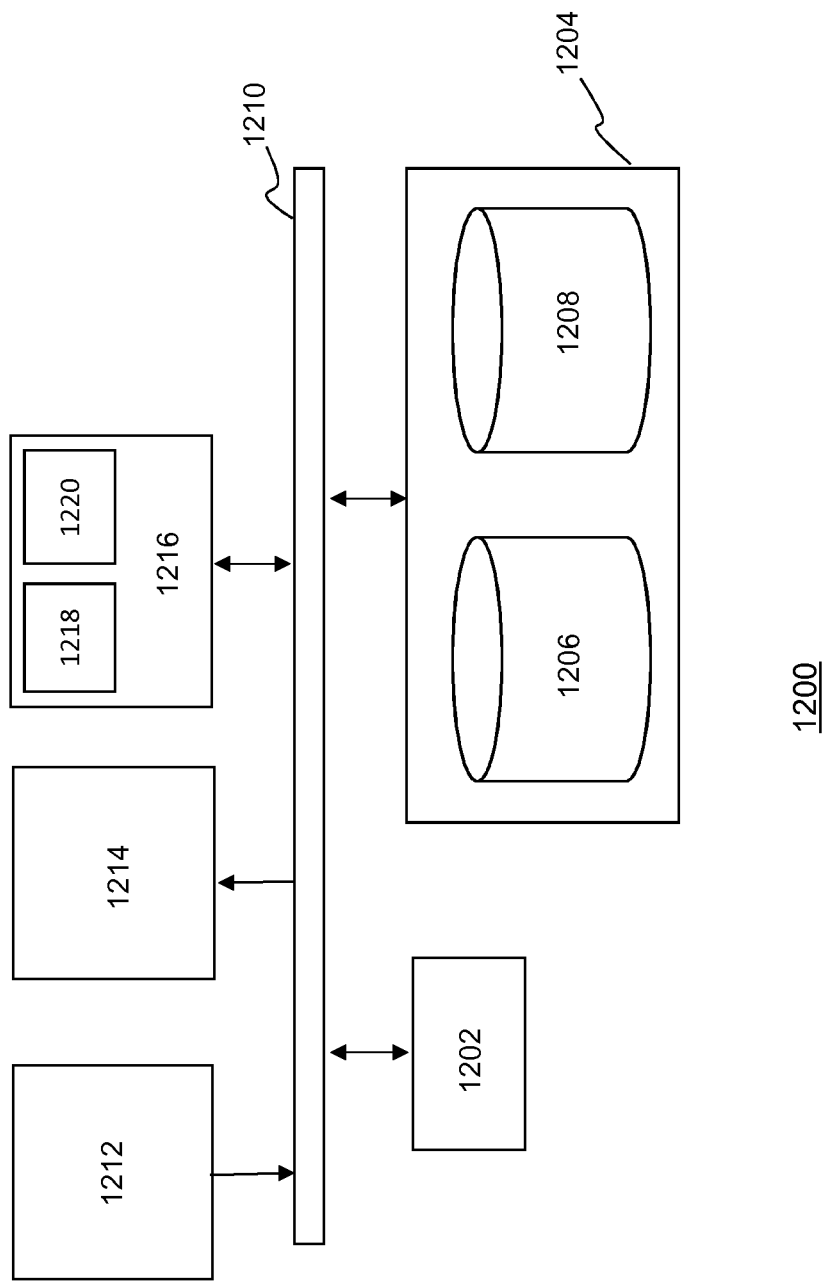
FIG. 12 provides a block diagram illustrating an exemplary data processing system that may be used to carry out method steps described herein, according to one embodiment of the present invention.

The method steps described herein to be performed by the interface entity 510 may be performed by any kind of a data processing system that includes at least a processor configured to carry out these method steps. An example of such a data processing system is illustrated in FIG. 12 as a data processing system 1200, and a discussion of where such a data processing system could be implemented is provided after the description of FIG. 12.

The data processing system 1200 may include at least one processor 1202 coupled to memory elements 1204 through a system bus 1210. As such, the data processing system may store program code within memory elements 1204. Further, processor 1202 may execute the program code accessed from memory elements 1204 via system bus 1210. In one aspect, data processing system 1200 may be implemented as a computer that is suitable for storing and/or executing program code. It should be appreciated, however, that system 1200 may be implemented in the form of any system including a processor and memory that is capable of performing the functions described within this specification.

Memory elements 1204 may include one or more physical memory devices such as, for example, local memory 1206 and one or more bulk storage devices 1208. Local memory may refer to random access memory or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from bulk storage device 1208 during execution.

Input/output (I/O) devices depicted as input device 1212 and output device 1214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may, in particular, comprise a data receiver 1218 for receiving data that is transmitted by said systems, devices and/or networks to said data and a data transmitter 1220 for transmitting data to said systems, devices and/or networks. Modems, cable modems, and Ethernet cards are examples of different types of network adapter that may be used with data processing system 1200.

The memory elements 1204 may store an application (not shown). It should be appreciated that data processing system 1200 may further execute an operating system (not shown) that can facilitate execution of the application. The application, being implemented in the form of executable program code, can be executed by data processing system 1200, e.g., by processor 1202. Responsive to executing the application, data processing system 1200 may be configured to perform one or more method steps described herein.

Persons skilled in the art will recognize that while the elements 1202-1220 are shown in FIG. 12 as separate elements, in other embodiments their functionality could be implemented in lesser number of individual elements or distributed over a larger number of components.

Figure 13:
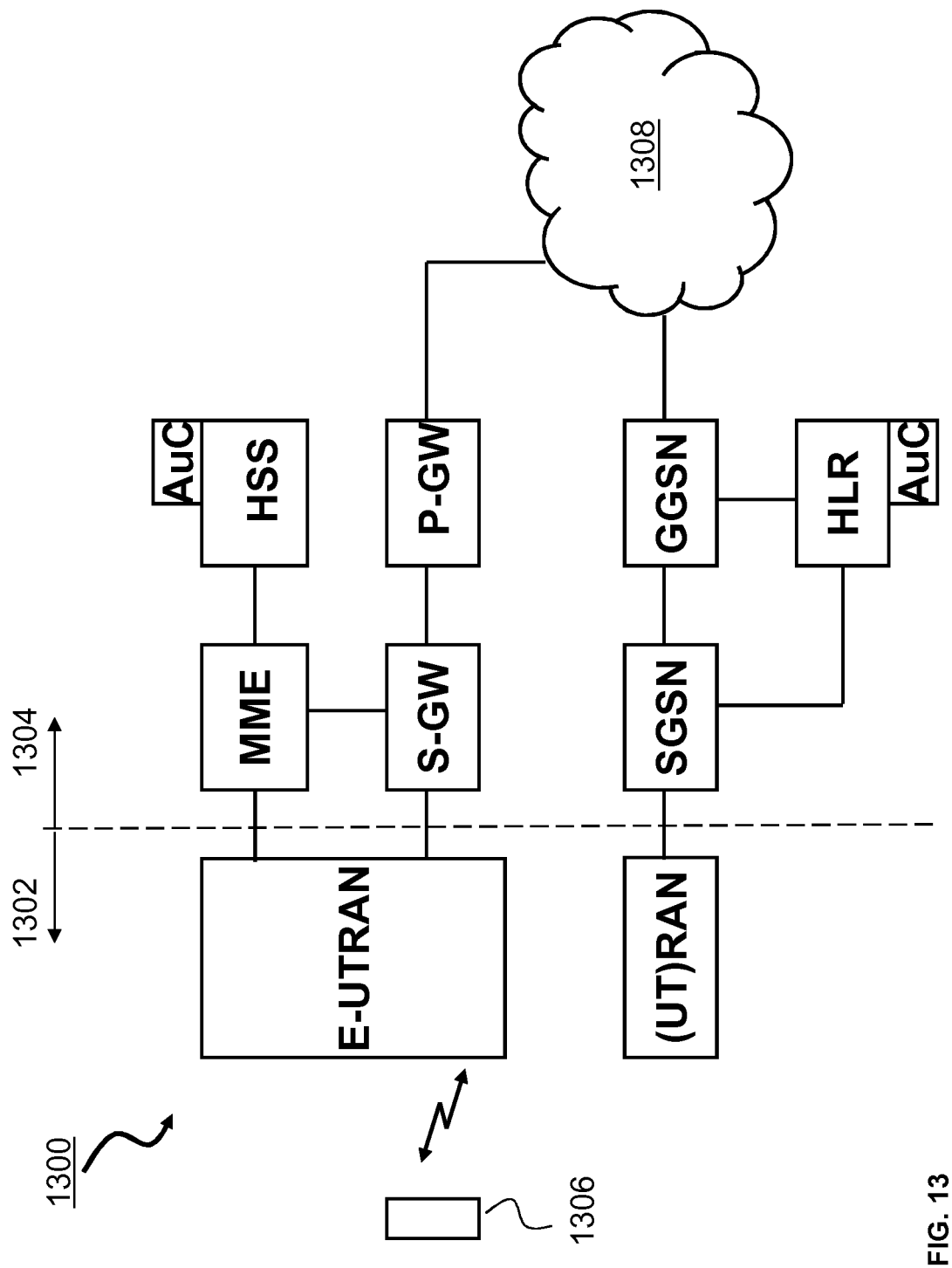
FIG. 13 provides a schematic illustration of telecommunications systems that could be used to implement functionality of the interface element described herein.

FIG. 13 provides a schematic illustration of a telecommunications system 1300. The telecommunications system 1300 comprises a radio access network 1302 (also indicated as E-UTRAN or RAN in FIG. 13) and a core network 1304 containing various elements or nodes as described in further detail below.

In the telecommunications system of FIG. 13, three generations of networks are schematically depicted together for purposes of brevity. A more detailed description of the architecture and overview can be found in 3GPP TS 23.002 which is included in the present application by reference in its entirety.

The lower branch of FIG. 13 represents a GPRS or UMTS telecommunications network.

For a GSM/GPRS telecommunications network (i.e., a 2G/2.5G telecommunications network), a radio access network 1302 comprises a plurality of base stations (combination of a BSC and a BTS) and one or more Radio Network Controllers (RNCs), not shown individually in FIG. 13. The core network 1304 comprises a Gateway GPRS Support Node (GGSN), a Serving GPRS Support Node (SGSN, for GPRS) or Mobile Switching Centre (MSC, for GSM, not shown in FIG. 13), and a Home Location Register (HLR) combined with an Authentication Centre (AuC). The HLR contains subscription information for mobile devices 1306 (sometimes referred to as "user equipment" (UE) or user devices) and the AuC contains a shared secret key K to be used for authentication and key agreement (AKA) procedures.

For a UMTS radio access network (UTRAN) (i.e., a 3G telecommunications network), the radio access network 1302 also comprises a Radio Network Controller (RNC) connected to a plurality of NodeBs, also not shown. In the core network 1304, the GGSN and the SGSN/MSC are conventionally connected to the HLR/AuC that contains subscription information and shared secret keys K of the mobile devices 1306.

It should be noted that the RNC functionality in GSM and UMTS networks is formally part of the RAN. The RNC functionality may be implemented in one or more base stations. Such a configuration is known as a collapsed architecture.

The upper branch in FIG. 13 represents a next generation telecommunications network, commonly indicated as Long Term Evolution (LTE) system or Evolved Packet System (EPS) (i.e., a 4G telecommunications network). In such a network, the radio access network 1302, indicated as E-UTRAN, comprises evolved NodeBs (eNodeBs or eNBs) providing wireless access for the mobile devices 1306. The core network 1304 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures. Further information of the general architecture of an EPS network can be found in 3GPP TS 23.401.

For GPRS, UMTS and LTE telecommunications network, the core network 1304 is generally connected to a further network 1308, e.g. the internet, using e.g. a gateway (e.g. the P-GW).

In various embodiments, the interface element 510 described herein can be implemented in hardware, software, or a combination of hardware and software. For example, in the networks illustrated in FIG. 13, the data processing system 1200 configured to act as the interface element 510 described herein could be implemented as a part of the S-GW, P-GW or the SGSN or GGSN of the core network, or the interface element 510 as described herein could be implemented as a software function on one or a combination of these elements of the core network. Of course, architectures other than defined by 3GGP, e.g. WiMAX, can also be used within the context of the present disclosure.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1202 described herein.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method for an interface element between a Virtual Network Function pool and a control entity, the Virtual Network Function pool comprising a plurality of Virtual Network Function instances which include at least a first Virtual Network Function instance and a second Virtual Network Function instance, the plurality of Virtual Network Function instances registered with a Virtual Network Function pool registrar communicatively connected to the interface element, the Virtual Network Function pool registrar configured to provide a handle to one of the Virtual Network Function instances to a pool user, the control entity configured to control the Virtual Network Function instances of the Virtual Network Function pool by sending control messages, the interface element to assist in replicating a state of the first Virtual Network Function instance at least on the second Virtual Network Function instance, the method comprising:
the interface element obtaining a control message from the control entity to the first Virtual Network Function instance, wherein the control message defines the state of the first Virtual Network Function instance;
the interface element providing the control message, or a derivation thereof, at least to the first Virtual Network Function instance and to the second Virtual Network Function instance; and
the interface element providing an acknowledgement of the control message to the control entity when the interface element has an acknowledgement of the control message or of the derivation thereof provided to the first Virtual Network Function instance and an acknowledgement of the control message or of the derivation thereof provided to the second Virtual Network Function instance.

2. The method according to claim 1, wherein the Virtual Network Function instances comprise two or more Virtual Network Function instances, wherein the interface element providing the control message at least to the first Virtual Network Function instance and to the second Virtual Network Function instance comprises providing the control message to at least two of the Virtual Network Function instances of the Virtual Network Function pool, and wherein the method further comprises:
the interface element identifying Virtual Network Function instances of the Virtual Network Function pool from which the interface element did not receive an acknowledgement of the control message; and
the interface element providing an indication of the identified Virtual Network Function instances to the Virtual Network Function pool registrar.

3. The method according to claim 1, further comprising establishing a base communication channel between the interface element and each of the control entity, the first Virtual Network Function instance, and the second Virtual Network Function instance.

4. The method according to claim 3, wherein the Virtual Network Function instances comprise two or more Virtual Network Function instances, wherein the interface element establishing the base communication channel comprises establishing the base communication channel between the interface element and each of the at least two of the Virtual Network Function instances of the Virtual Network Function pool, and wherein the method further comprises:
the interface element identifying Virtual Network Function instances of the Virtual Network Function pool with which the base communication channel could not be established and/or was broken; and
the interface element providing an indication of the identified Virtual Network Function instances to the Virtual Network Function pool registrar.

5. The method according to claim 3, further comprising the interface element establishing a secure communication channel over the base communication channel established between the interface element and each of the control entity, the first Virtual Network Function instance, and the second Virtual Network Function instance.

6. The method according to claim 5, wherein the secure communication channel comprises a SSL/TLS-based channel.

7. The method according to claim 5, wherein the secure communication channel between the interface element and each of the control entity, the first Virtual Network Function instance, and the second Virtual Network Function instance is established substantially in parallel.

8. The method according to claim 5, wherein the Virtual Network Function instances comprise two or more Virtual Network Function instances, wherein the interface element establishing the secure communication channel comprises establishing the secure communication channel between the interface element and each of at least two of the Virtual Network Function instances of the Virtual Network Function pool, and wherein the method further comprises:
the interface element identifying Virtual Network Function instances of the Virtual Network Function pool with which the secure communication channel could not be established and/or was broken; and
the interface element providing an indication of the identified Virtual Network Function instances to the Virtual Network Function pool registrar.

9. A computer program product stored on a computer-readable non-transitory storage medium, the computer program product comprising software code portions configured for, when executed on a processor, carrying out method steps according to claim 1.

10. A data processing system comprising at least a processor configured to carry out a method for an interface element between a Virtual Network Function pool and a control entity, the Virtual Network Function pool comprising a plurality of Virtual Network Function instances which include at least a first Virtual Network Function instance and a second Virtual Network Function instance, the plurality of Virtual Network Function instances registered with a Virtual Network Function pool registrar communicatively connected to the interface element, the Virtual Network Function pool registrar configured to provide a handle to one of the Virtual Network Function instances to a pool user, the control entity configured to control the Virtual Network Function instances of the Virtual Network Function pool by sending control messages, the data processing system to assist in replicating a state of the first Virtual Network Function instance at least on the second Virtual Network Function instance, the method comprising:
- the interface element obtaining a control message from the control entity to the first Virtual Network Function instance, wherein the control message defines the state of the first Virtual Network Function instance;
- the interface element providing the control message, or a derivation thereof, at least to the first Virtual Network Function instance and to the second Virtual Network Function instance; and
- the interface element providing an acknowledgement of the control message to the control entity when the interface element has an acknowledgement of the control message or of the derivation thereof provided to the first Virtual Network Function instance and an acknowledgement of the control message or of the derivation thereof provided to the second Virtual Network Function instance.

11. A system comprising:
- a Virtual Network Function pool comprising a plurality of Virtual Network Function instances which include at least a first Virtual Network Function instance and a second Virtual Network Function instance;
- a control entity configured to control the Virtual Network Function instances of the Virtual Network Function pool by sending control messages;
- a Virtual Network Function pool registrar with which the Virtual Network Function instances of the Virtual Network Function pool are registered and which is configured to provide a handle to one of the Virtual Network Function instances to a pool user; and
- an interface element communicatively connected to each of the Virtual Network Function instances, the Virtual Network Function pool registrar and to the control entity,
wherein the interface element is configured to
obtain a control message from the control entity to the first Virtual Network Function instance, wherein the control message defines the state of the first Virtual Network Function instance;
provide the control message, or a derivation thereof, at least to the first Virtual Network Function instance and to the second Virtual Network Function instance; and
provide an acknowledgement of the control message to the control entity when the interface element has an acknowledgement of the control message or of the derivation thereof provided to the first Virtual Network Function instance and an acknowledgement of the control message or of the derivation thereof provided to the second Virtual Network Function instance.

12. The system according to claim 11, wherein the Virtual Network Function pool registrar is configured to at least receive from the interface element the Virtual Network Function instances identified by the interface element as Virtual Network Function instances of the Virtual Network Function pool from which the interface element did not receive an acknowledgement of the control message.

13. The system according to claim 12, wherein the Virtual Network Function pool registrar is further configured to provide to the pool user a handle to a backup Virtual Network Function instance in case of a switch from the first Virtual Network Function instance.

14. The system according to claim 12, wherein the Virtual Network Function pool registrar is further configured to provide to the pool user a handle to a second Virtual Network Function instance in case of load sharing between at least the first Virtual Network Function instance and the second Virtual Network Function instance in the data plane.

* * * * *